United States Patent
Isozu

(10) Patent No.: US 8,005,054 B2
(45) Date of Patent: Aug. 23, 2011

(54) COMMUNICATION SYSTEM, COMMUNICATION METHOD, COMMUNICATION TERMINAL DEVICE, CONTROL METHOD THEREOF, AND PROGRAM

(75) Inventor: Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 10/567,101

(22) PCT Filed: Aug. 6, 2004

(86) PCT No.: PCT/JP2004/011651
§ 371 (c)(1), (2), (4) Date: Feb. 3, 2006

(87) PCT Pub. No.: WO2005/015856
PCT Pub. Date: Feb. 17, 2005

(65) Prior Publication Data
US 2008/0310340 A1    Dec. 18, 2008

(30) Foreign Application Priority Data

Aug. 8, 2003    (JP) ................. 2003-290468
Aug. 8, 2003    (JP) ................. 2003-290469
Aug. 8, 2003    (JP) ................. 2003-290470

(51) Int. Cl.
*H04W 4/00* (2009.01)
*H04L 12/28* (2006.01)
(52) U.S. Cl. .............. 370/338; 370/328; 370/351
(58) Field of Classification Search .......... 370/338, 370/328, 351
See application file for complete search history.

(56) References Cited

U.S. PATENT DOCUMENTS

2002/0049561 A1    4/2002    Garcia-Luna-Aceves et al.
(Continued)

FOREIGN PATENT DOCUMENTS

JP    56-140744    11/1981
(Continued)

OTHER PUBLICATIONS

Hasebe, Kenji et al: "Multiple-Route Adhoc Ondemand Routing (MRAODV) Protocol", Information Processing Society of Japan Kenkyu Hokoku, vol. 2002, No. 49, pp. 25-32, May 24, 2002.

(Continued)

*Primary Examiner* — Pierre-Louis Desir
*Assistant Examiner* — Timothy Pham
(74) *Attorney, Agent, or Firm* — Oblon, Spivak, McClelland, Maier & Neustadt, L.L.P.

(57) ABSTRACT

The present invention proposes a highly reliable communication system and communication method, a communication terminal device used for the communication system, a control method thereof, and a program installed on the communication terminal device. In communication system and communication method, the communication terminal device used for the communication system, the control method thereof, and the program installed on the communication terminal device, a first communication terminal originates a first message. In response to the first message, a third communication terminal originates a second message. Based on these messages, the first through third communication terminals create routes to the first or third communication terminal. The first communication terminal transmits a route request composed of a request for a route used for communication with the third communication terminal. The second and third communication terminals create multiple routes to the first or third communication terminal. A communication route is established between the first and third communication terminals using a route that belongs to the created routes and satisfies the route request transmitted from the first communication terminal.

17 Claims, 22 Drawing Sheets

10

U.S. PATENT DOCUMENTS

| | | | |
|---|---|---|---|
| 2003/0202476 A1* | 10/2003 | Billhartz et al. | 370/236 |
| 2004/0029553 A1* | 2/2004 | Cain | 455/403 |
| 2004/0203820 A1* | 10/2004 | Billhartz | 455/452.1 |
| 2004/0233855 A1* | 11/2004 | Gutierrez et al. | 370/252 |

FOREIGN PATENT DOCUMENTS

| | | |
|---|---|---|
| JP | 60-52143 | 3/1985 |
| JP | 62-53546 | 3/1987 |
| JP | 4-154341 | 5/1992 |
| JP | 4-369948 | 12/1992 |
| JP | 5-41689 | 2/1993 |
| JP | 6-45990 | 2/1994 |
| JP | 6-232908 | 8/1994 |
| JP | 8-294158 | 11/1996 |
| JP | 11-55313 | 2/1999 |
| JP | 3102057 | 8/2000 |
| JP | 2000-244601 | 9/2000 |
| JP | 3102057 | 10/2000 |
| JP | 2001-136178 | 5/2001 |
| JP | 2001-346238 | 12/2001 |
| JP | 2002-261857 | 9/2002 |
| JP | 2003-198563 | 7/2003 |
| JP | 2003-219472 | 7/2003 |
| JP | 2003-258861 | 9/2003 |
| JP | 2003-299150 | 10/2003 |
| JP | 2003-304280 | 10/2003 |
| JP | 2003-324443 | 11/2003 |
| JP | 2003-338856 | 11/2003 |
| JP | 2004-23440 | 1/2004 |
| JP | 2004-234430 | 1/2004 |
| JP | 2004-56787 | 2/2004 |
| JP | 2004-282270 | 10/2004 |
| JP | 2005-64721 | 3/2005 |
| JP | 2005-64722 | 3/2005 |
| JP | 2005-64723 | 3/2005 |
| JP | 2005-72720 | 3/2005 |
| JP | 2005-101872 | 4/2005 |
| JP | 2005-286989 | 10/2005 |
| JP | 4131181 | 6/2008 |
| WO | WO 03/061220 A1 | 7/2003 |
| WO | WO 2004/057903 A1 | 7/2004 |

OTHER PUBLICATIONS

Hasebe, Kenji et al.: "Multipath Ad-hoc On-Demand Distace Vector Routing Protocol" Multimedia Tsushin to Bunsan Shori Workshop Ronbunshu, Information Processing Society of Japan Symposium Series, vol. 2001, No. 13, pp. 163-168, Oct. 2001.

Shinji Motegi, et al., "Proposal on a Multipath Routing for Ad hoc Networks",Institute of Electronics, Information and Communication Engineers Technical Study Report, vol. 102, No. 445, Nov. 15, 2002, pp. 51-56.

Kenji Hasebe, et al., "Multiple-Route Ad hoc Ondemand Routing (MRAODV) Protocol", Information Processing Society Memoir, Information Processing Society of Japan, vol. 2002, No. 12, Feb. 14, 2002, pp. 13-18.

* cited by examiner

| Message ID | 70₁ |
| Originator Address | 70₂ |
| Source Address | 70₃ |
| Destination Address | 70₄ |
| Link Quality | 70₅ |
| Packet Error Rate | 70₆ |
| Route Status | 70₇ |
| Comment | 70₈ |

FIG. 19    LM

| Destination Address | Originator Address #1 | Message ID | Count | Link Quality | Error Rate | Route Status | Etc... |
|---|---|---|---|---|---|---|---|
| | Originator Address #2 | Message ID | Count | Link Quality | Error Rate | Route Status | Etc... |
| | Originator Address #... | Message ID | Count | Link Quality | Error Rate | Route Status | Etc... |
| | Originator Address #n | Message ID | Count | Link Quality | Error Rate | Route Status | Etc... |

FIG. 21

COMMUNICATION SYSTEM, COMMUNICATION METHOD, COMMUNICATION TERMINAL DEVICE, CONTROL METHOD THEREOF, AND PROGRAM

TECHNICAL FIELD

The present invention relates to a communication system, a communication method, a communication terminal device; its control method, and a program. The present invention can be appropriately applied to an ad-hoc network system, for example.

BACKGROUND ART

Recently, with the spread of mobile computers such as notebook personal computers and PDAs, there is an increasing demand for the networked computing environment capable of wirelessly connecting the mobile computers. These networks include an ad-hoc network.

The ad-hoc network does not use a dedicated router for relaying data. Each communication terminal (hereafter referred to as a node) routes messages according to the wireless communication to be able to construct a highly mobile, flexible, and economical network.

In the ad-hoc network, the wireless network is used to connect all nodes to each other. Differently from a conventional static network, the ad-hoc network is subject to very frequent changes in the topology. It is necessary to establish a route control system (routing protocol) for ensuring the reliability.

Presently suggested routing protocols for ad-hoc networks are broadly classified into two categories: on-demand and table-driven protocols. The on-demand routing protocol discovers a communication route to a communication destination immediately before initiation of the communication. According to the table-driven routing protocol, each node previously discovers a communication route to the other node irrespectively of the presence or absence of communication and maintains the detected communication route as a table. In recent years, there is proposed a hybrid routing protocol that integrates the routing protocols.

Representative on-demand routing protocols include the AODV (Adhoc On-demand Distance Vector) protocol (e.g., see patent document 1) proposed by MANET WG (Mobil Adhoc NETwork Working Group) of IETF (Internet Engineering Task Force). The following describes a route discovery process in AODV.

FIG. 25(A) shows an ad-hoc network system 1 constructed from multiple nodes A' through E' ands. In FIG. 25(A), nodes A' through E' and S' belong to a communicable range and are connected by lines with each other. Accordingly, nodes A' through E' and S' not connected by lines need to communicate with each other via the other nodes A' through E' and S'. In this case, the route discovery process to be described later is used to discover routes between the nodes A' through E' and S' to be communicated.

For example, let us suppose that node S' attempts to start communicating with node D' but does not know a communication route to node D'. In such case, node S' broadcasts a route request message (RREQ: Route Request) 2 as shown in FIG. 26.

The route request message 2 is composed of fields $3_1$ through $3_9$, i.e., "Type", "Flag", "Reserved", "Hop Count", "RREQ ID", "Destination Address", "Destination Sequence Number", "Originator Address" and "Originator Sequence Number". "Type" field $3_1$ stores a message type ("1" for a route request message). "Flag" field $3_2$ stores a flag for various communication control. "Hop Count" field $3_4$ stores a hop count ("0" as an initial value). "RREQ ID" field $3_5$ stores a unique ID provided for the route request message (hereafter referred to as a route request message ID).

In the route request message 2, "Destination Address" field $3_6$ stores the address of node D' as a transmission destination of the route request message. "Destination Sequence Number" field $3_7$ stores the sequence number of node D' which node S' identified last. "Originator Address" field $3_8$ stores the address of node S'. "Originator Sequence Number" field $3_9$ stores the sequence number of node S'.

Each of the nodes A' through E' receives the route request message 2 and determines whether or not the route request message 2 is addressed to itself based on the destination of the route request message 2. The destination is stored in "Destination Address" field $3_6$ of the route request message. When the route request message is not addressed to that node, it increments by one the hop count stored in "Hop Count" field $3_4$ and broadcasts the route request message 2.

At this time, each of the nodes A' through E' checks whether or not its route table contains an address of node D', i.e., a destination of the route request message 2. When such address is not found, each of the nodes A' through E' inserts various information (entries) about a reverse path to the node D' into the route table.

The route table is referenced when receiving data to be transmitted thereafter to the destination node (node D' in this example). As shown in FIG. 27, the route table is composed of "Destination Address", "Destination Sequence Number", "Hop Count", "Next Hop", "Precursor List", and "Lifetime" fields $5_1$ through $5_6$.

During the process of inserting the reverse path into the route table 4, each of the nodes A' through E' copies "Destination Address", "Destination Sequence Number", and "Hop Count" fields $3_6$, $3_7$, and $3_4$ in the route request message 2 to any of "Destination Address", "Destination Sequence Number", and "Hop Count" fields $5_1$ through $5_3$ in the route table 4.

The nodes A' through E' use "Next Hop" field $5_4$ in the route table 4 to store addresses of adjacent nodes A' through C', E', and S' that transferred the route request message 2 contained in the header of the packet storing the route request message 2. This establishes a reverse path to the node D'. When data is subsequently transmitted to indicate the node D' as a transmission destination, the data is transferred to nodes A' through E' having the addresses stored in the corresponding "Next Hop" field 53 based on the route table 4.

Further, the nodes A' through E' use "Precursor List" field $5_5$ in the route table 4 to store a list of the other nodes A' through E' whose route is to be used for the communication. The nodes A' through E' use "Lifetime" field $5_6$ to store the lifetime of the route. Thereafter, it is determined whether or not the entry can be alive based on the lifetime stored in "Lifetime" field $5_6$. When the entry is not used and the lifetime expires, the entry is deleted from the route table 4.

Subsequently, the similar process takes place for the corresponding nodes A' through E' in the ad-hoc network system 1. Finally, the route request message 2 reaches the node D' as the route request message transmission destination (FIG. 25(B)).

When receiving the route request message 2, each of the nodes A' through E' checks the route request message ID ("RREQ ID" in FIG. 26) of the route request message 2 to prevent the message from being received repeatedly. When receiving the route request message 2 with the same route request message ID in the past, the node discards the route request message 2.

There may be a case where the route request message 2 reaches the node D' duplicatively via different routes. In such case, the node D' gives preference to the route request message that arrived first. The second and later route request messages that arrived are discarded. This makes it possible to bidirectionally create a unique route from the node S as the transmission origin to the node D' as the transmission destination.

On the other hand, the node D' receives the route request message 2 to create a route reply (RREP) message 6 as shown in FIG. 28. The node D' unicasts this message to the adjacent nodes C' and E' that transferred the route request message 2.

The route reply message 6 is composed of "Type", "Flag", "Reserved", "Prefix Sz", "Hop Count", "Destination Address", "Destination Sequence Number", "Originator Address", and "Lifetime" fields $7_1$ through $7_9$. "Type" field $7_1$ stores a message type ("2" for the route reply message). "Flag" field $7_2$ stores a flag for various communication control. "Prefix Sz" field $7_4$ stores a subnet address. "Hop Count" field $7_5$ stores a hop count (initial value is "0").

Data for any of "Originator Address", "Originator Sequence Number", and "Destination Address" fields $3_8$, $3_9$, and $3_6$ of the route request message 2 is copied to "Destination Address", "Destination Sequence Number", and "Originator Address" fields $7_6$ through $7_8$ of the route reply message 6.

When receiving the route reply message 6, each of the nodes C' and E' determines whether or not the route reply message 6 is addressed to itself based on the destination in the route reply message 6 described in "Destination Address" field $3_6$ of the route reply message 6. When the route reply message 6 is not addressed to itself, the node increments by "1" the hop count stored in "Hop Count" field $3_4$. The node then unicasts the route reply message 6 to nodes A' through C' and E' (described in "Next Hop" field $5_4$ of the route table 4 (FIG. 27) for the node S), i.e., the nodes configured as the reverse path for transfer of the route request message 2.

At this time, each of the nodes A' through C', E', and S' determines whether or not its route table 4 contains an address of the node D as the transmission origin of the route reply message 6. When such address does not exist, the nodes insert entries for the reverse path up to the node D into the route table 4 in a manner similar to that described with reference to FIG. 27.

A similar process subsequently takes place for the corresponding nodes A' through C', and E' successively. The route reply message 6 is finally transmitted to the node S, i.e., the transmission destination of the route request message 2 (FIG. 25(C)). The node S' receives the route reply message 6 to terminate the route discovery process.

According to AODV, each of nodes A' through E' and S' discovers and configures communication routes to the communication destination node.

When an error may occur on a route between nodes available on the communication route, an error handling technique needs to be used to establish a new communication route (hereafter referred to as an alternative route) as a substitute for the current communication route.

The AODV in the on-demand routing protocol provides the local repair as such error handling technique. As shown in FIG. 29, for example, when a disconnection occurs on the route between nodes A' and C' on the communication route (S'-A'-C'-D'), the local repair performs the above-mentioned route discovery process using the disconnecting node A' as a starting point to establish an alternative route (S'-A'-B'-E'-D') to node D'.

In this case, the route table 4 (FIG. 27) may be previously enhanced to use a field to indicate a route quality state. In consideration for the route quality state, the route discovery process may be performed to establish a highly reliable alternative route (e.g., see patent document 2).

Patent document 1: U.S. Patent No. 20020049561
Patent document 2: U.S. Patent No. 005949760 (FIG. 2)

As mentioned above, the on-demand, table-driven, and hybrid routing protocols are currently proposed for ad-hoc networks. These routing protocols differ from each other in the methods of creating routes, but are common to each other in that any of these protocols only uses one route (next hop) corresponding to one destination in the route table. For example, there may be a demand for using a different route when an error occurs during communication between nodes. In such case, those protocols necessitate a wait for a new route to be created in accordance with some methods.

In this case, the on-demand protocol detects an error occurrence and then creates a new route, causing an increased overhead or time for restoration. The table-driven protocol is relatively highly resistant to errors because the routing protocol always exchanges route information. However, always exchanging information increases the overhead. Actually, it is not recommended to always exchange route information from the viewpoint of power consumption in consideration for the environment where mobile devices are connected to an ad-hoc network. On the other hand, a long cycle to update the route table may make it difficult to respond to a sudden error occurrence.

When an error occurs on the communication between nodes to disconnect the communication, for example, the above-mentioned AODV protocol creates a now route using the local repair technique of allowing nodes at both ends to transmit a message requesting rediscovery of a route. According to its architecture, the AODV protocol can create only one route at a time. When a link fails, the AODV protocol, in principle, disconnects the link and then starts creating a new route. The local repair, when capable of creating routes, could be an effective technique for the realtime communication that requires instancy.

As mentioned above, the general ad-hoc routing establishes a single route to one destination in the route table, making it difficult to provide sufficient corrective measures against error occurrences on the communication between nodes. It is difficult for the AODV, a representative on-demand routing protocol, to maintain multiple routes at a time. Even the AODV does not fully meet the requirements for error handling.

There are also proposed systems for creating multiple routes. These route control systems allow an intermediate node for maintaining routes to determine which route to use. A sending party cannot select all routes. Even when any of multiple routes can be selected, data packet originated from the same transmission origin all pass the same route. This does not ensure the effective use of multiple routes such as using different routes according to data packet attributes and freely changing routes based on the chronologically varying link quality. Generally, a long-unused route in the ad-hoc network is often automatically deleted. Even when the routing protocol is used to establish multiple routes, there are many routes that remain unused and are deleted from the route table in the long run.

For example, in the thesis "On-demand Multipath Distance Vector Routing in Ad Hoc Networks (Mahesh K. Marina, Samir R. D as, Department of Electrical & Computer Engineering and Computer Science University of Cincinnati, USA)", there is proposed the multi-path routing as an on-demand routing protocol for creating multiple routes. However, no specification is given to a method of selecting routes.

Due to the above-mentioned problems, efficiently using multiple routes is difficult for a so-called multi-path routing protocol, i.e., a relatively highly reliable routing protocol for establishing multiple routes. It becomes especially difficult to efficiently use routes according to user requests and the link quality.

Further, the above-mentioned local repair performs the route discovery process from a point (detection point) where a given route is already disconnected even when an alternative route is established in consideration for route quality states. Accordingly, the local repair increases loads to process data which cannot be transmitted until establishment of the alternative route or prolongs the time consumed to establish the alternative route. The local repair cannot provide effective error handling for some communication types such as realtime communication that requires instancy.

A new alternative route is established from node A' as a start point on the disconnected route. As shown in FIG. 29, the ad-hoc network subject to frequent topology changes may establish a detouring alternative route (S'-A'-B'-E'-D') with many hop counts although there is the shortest alternative route (S'-B'-E'-D'). That is, there may be a possibility of failing to establish an optimum alternative route in accordance with frequently varying topology configurations.

On the other hand, when the route is disconnected, it may be possible to establish an alternative route from node S' instead of the disconnecting origin. In this case, it is possible to establish an optimum alternative route in accordance with frequently varying topology configurations without establishing a detouring alternative route with many hop counts. However, there still remains the problem of increasing processing loads and the time consumption, making it difficult to provide effective error handling for some communication types such as realtime communication that requires instancy.

In this manner, the local repair establishes an alternative route from a point where the route is already disconnected, making it difficult to provide sufficient error handling depending on communication situations.

On the other hand, the table-driven protocol uses the routing protocol to always exchange route information between nodes, increasing processing loads for exchanging the route information. The table-driven protocol is not suited for communication modes such as the realtime communication requiring instancy independently of the presence or absence of error handling and the other communications requiring low power consumption.

DISCLOSURE OF THE INVENTION

The present invention has been made in consideration of the foregoing. It is therefore an object of the present invention to provide a highly reliable communication system, a communication method, a communication terminal device, its control method, and a program.

To solve the above-mentioned problem, the present invention provides a communication system, a communication method, a communication terminal device used for the communication system, a control method thereof, and a program installed on the communication terminal device, wherein a first communication terminal originates a first message to a third communication terminal via a second communication terminal, the third communication terminal originates a second message in response to the first message to the first communication terminal via the second communication terminal, the first through third communication terminals create routes to the first through third communication terminals based on the first and second messages, and the first and third communication terminals communicate with each other via the created routes. The first communication terminal transmits a route request composed of a request for the route to be used for the communication with the third communication terminal. The second and third communication terminals duplicatively receive the first or second message to create the multiple routes to the first or third communication terminal. A communication route is established between the first and third communication terminals using a route which belongs to the multiple created routes and satisfies the route request transmitted from the first communication terminal.

As a result, according to the communication system, the communication method, the communication terminal device used for the communication system, the control method thereof, and the program installed on the communication terminal device, the first communication terminal can establish a communication route for the second and third communication terminals using an intended route out of those created by the second or third communication terminal. The first and third communication terminals can communicate with each other using an optimum communication route.

As mentioned above, the present invention provides the communication system, the communication method, the communication terminal device used for the communication system, the control method thereof, and the program installed on the communication terminal device, wherein the first communication terminal originates a first message to the third communication terminal via the second communication terminal, the third communication terminal originates a second message in response to the first message to the first communication terminal via the second communication terminal, the first through third communication terminals create routes to the first through third communication terminals based on the first and second messages, and the first and third communication terminals communicate with each other via the created routes. The first communication terminal transmits a route request composed of a request for the route to be used for the communication with the third communication terminal. The second and third communication terminals duplicatively receive the first or second message to create the multiple routes to the first or third communication terminal. A communication route is established between the first and third communication terminals using a route which belongs to the multiple created routes and satisfies the route request transmitted from the first communication terminal. The first and third communication terminals can communicate with each other using an optimum communication route. In this manner, it is possible to provide the highly reliable communication system and communication method, the communication terminal device used for the communication system, the control method thereof, and the program installed on the communication terminal device.

BRIEF DESCRIPTION OF THE DRAWINGS

FIG. 19 is a diagram showing the configuration of a link state notification message;

FIG. 21 is a diagram showing a link state table;

BEST MODE FOR CARRYING OUT THE INVENTION

Embodiments of the present invention will be described in further detail with reference to the accompanying drawings.

Figure 1:
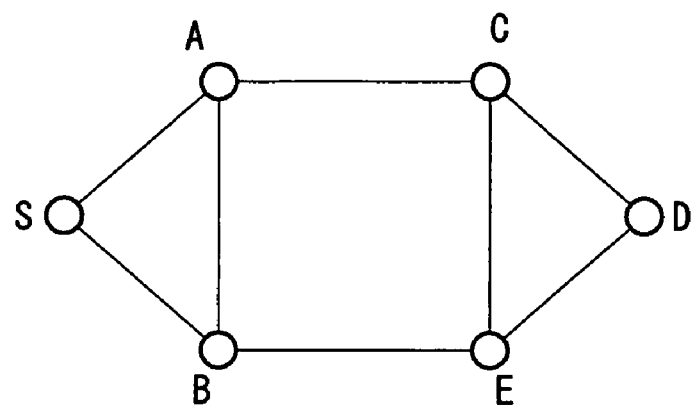
FIG. 1 is a conceptual diagram showing the configuration of an ad-hoc network system according to an embodiment.
Figure 25:
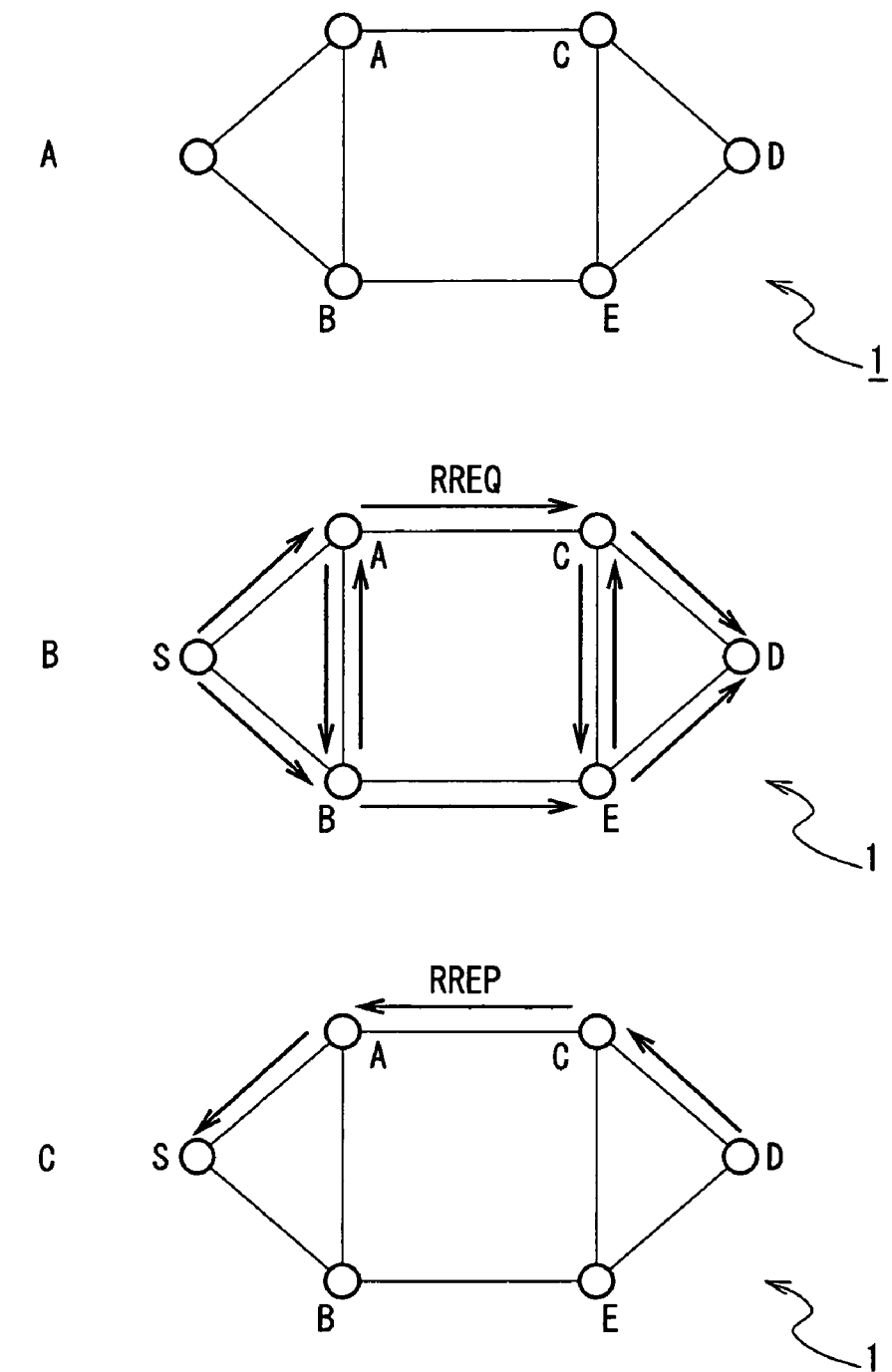
FIG. 25 is a conceptual diagram showing creation of routes in a conventional ad-hoc network system.

(1) First Embodiment (1-1) Configuration of an Ad-Hoc Network System According to a First Embodiment
(1-1-1) Schematic Configuration of the Ad-Hoc Network System According to the First Embodiment In FIG. 1, reference numeral 10 denotes an ad-hoc network system as a whole according to the embodiment. Each of nodes A through E and S creates multiple routes when the communication starts. The ad-hoc network system 10 has almost the same configuration as the above-mentioned ad-hoc network system 1 in FIG. 25 except that the routes are selectively used upon occurrence of a communication error during the subsequent data communication.

In the ad-hoc network system 10, for example, node S broadcasts a route request message 20 (FIG. 3) assigned with node D as a transmission destination so that node S can transmit data to node D.

Figure 7:
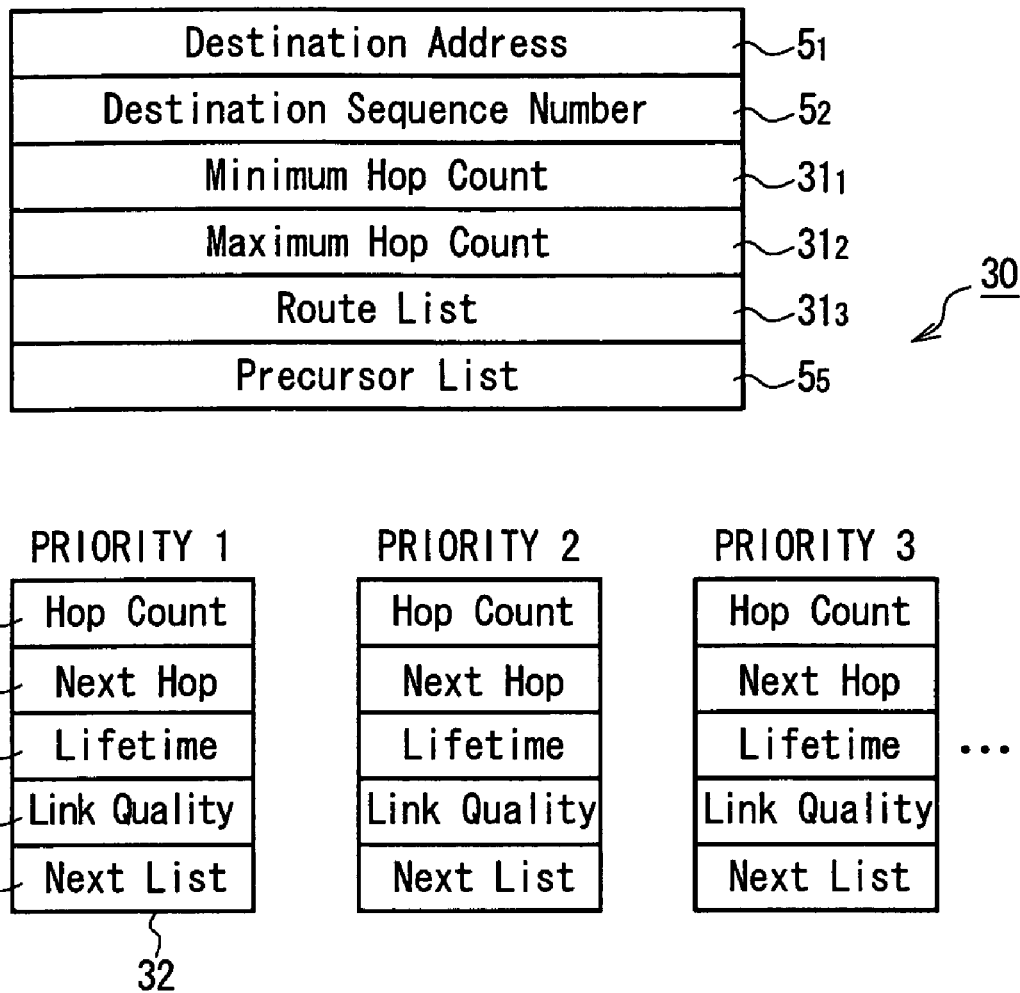
FIG. 7 is a conceptual diagram showing the configuration of a route table according to the embodiment.

Nodes A through E other than node S establish reverse paths to duplicatively receive a route request message 20 transmitted via different routes. The nodes successively broadcast the messages. As a result, multiple routes are created from node S to node D. Nodes A through E and S prioritize the created routes according to a predetermined criterion and manage them in a route table 30 (FIG. 7).

When receiving the route request message 20, node D unicasts (i.e., multicasts) a route reply message 23 (FIG. 6) assigned with node S as a transmission destination for each of the created routes. The route reply, message 23 is transmitted in a reverse direction of the routes specified for transfer of the route request message 20. Nodes A through C, E, and S other than node D each establish reverse paths to node D to duplicatively receive the route reply message 23. The nodes unicast the route reply messages 23 to each of the routes to node S specified for transfer of the route request message 20. As a result, multiple routes are created from node D to node S. Nodes A through E and S prioritize the created routes according to a predetermined criterion and manage them in the route table 30.

Subsequently, node S starts data transmission. Data is transmitted to nodes A through E. Each of the nodes selects the most highly prioritized route out of the others managed in its route table 30 and transmits the data to the corresponding nodes A through E. In this manner, data transmitted from node S travels a route most appropriate to the predetermined criterion and reaches node D.

When a communication error occurs during the data transmission, any of nodes A through E and S subject to the communication error selects a route that belongs to routes managed in its route table 30 and is more highly prioritized than the currently used route. The currently used route is changed to the selected route to transmit the data to nodes A through E.

When the data is transmitted, nodes A through E selected for the new route select the most highly prioritized one of routes managed in its route table and transmit the data to the corresponding nodes A through E. Similarly, the subsequent nodes A through E successively transfer data successively transmitted from the precedent nodes A through E to nodes A through E as the next hop.

When a communication error occurs, the ad-hoc network system 10 immediately selects one of the other previously created routes to continue the communication. The ad-hoc network system 10 is configured to be able to practically thoroughly handle sudden communication error occurrence.

Figure 2:
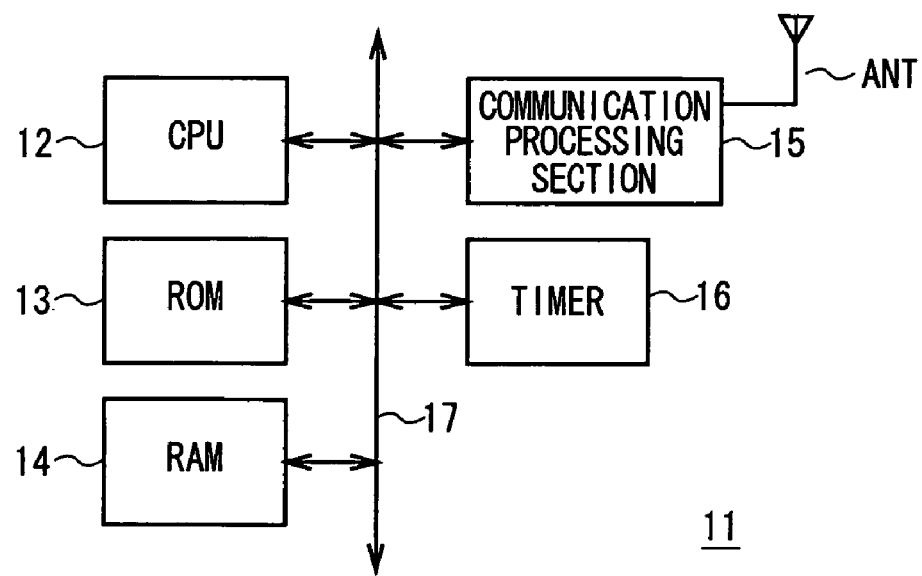
FIG. 2 is a block diagram showing the configuration communication function blocks in each node.

FIG. 2 shows the hardware configuration of a communication function block 11 installed in each of nodes A through E and S.

As shown in FIG. 2, the communication function block 11 for each of nodes A through E and S is configured so that a bus 17 is used to connect a CPU (Central Processing Unit) 12, ROM (Read Only Memory) 13 for storing various programs, RAM (Random Access Memory) 14 as work memory for the CPU 12, a communication processing section 15 for wireless communication with the other nodes A through E and S, and a timer 16 with each other.

The CPU 12 performs the above-mentioned various processes (also to be described later) based on programs stored in ROM 13. As needed, the CPU 12 transmits various messages such as the route request message 20 and the route reply message 23 and various data such as AV (Audio Video) data to the other nodes A through E and S via the communication processing section 15.

The CPU 12 creates the route table 30 to be described later based on the route request message 20 received via the communication processing section 15 from the other nodes A through E and S, stores and holds it in the RAM 14. Based on count values of the timer 16, the CPU 12 manages the lifetime and the like of route entries stored in the route table 30 up to each of nodes A through E and S.

(1-1-2) Specific Processing Contents of the Route Discovery Process in Each Node The following describes specific processing contents of the route discovery process in each of nodes A through E and S.

In the ad-hoc network system 10, as mentioned above, each of nodes A through E duplicatively receives the route request message 20 to create multiple routes up to node S as the transmission origin of the route request message 20.

As mentioned above, nodes A through E are configured to duplicatively receive the same route request message transmitted via different routes. In this case, the route request message 20 may loop. The relaying nodes A through E may repeatedly receive the same route request message 20.

Figure 3:
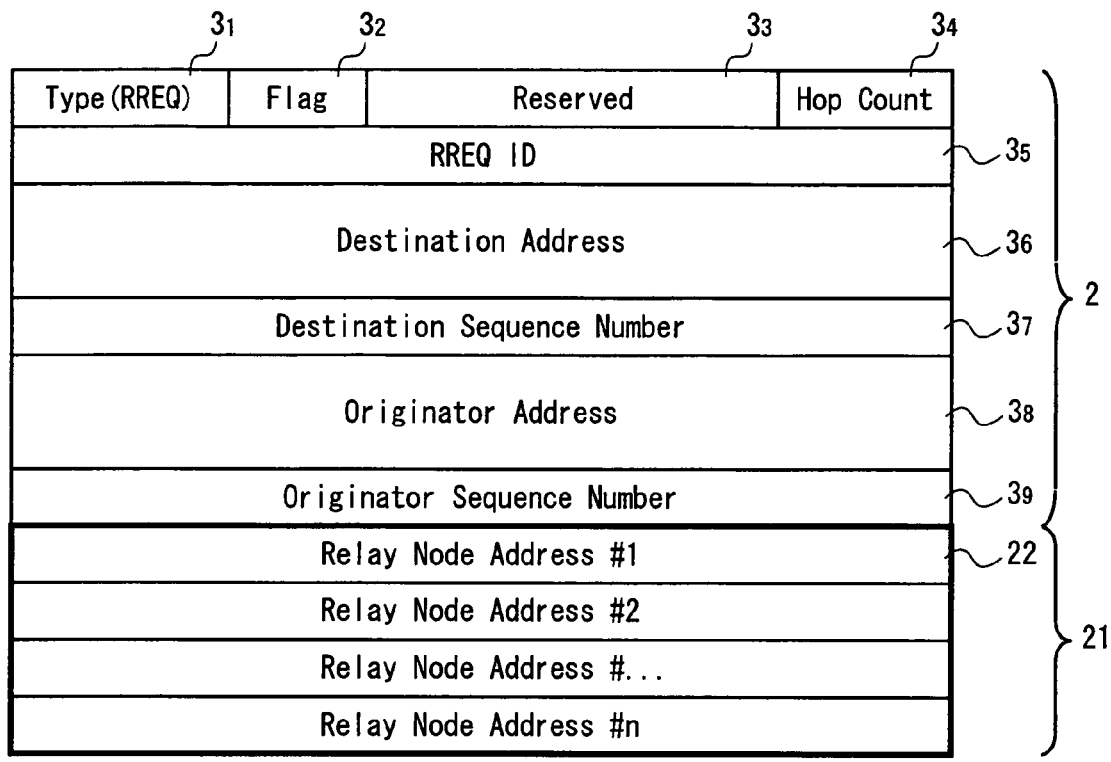
FIG. 3 is a conceptual diagram showing the configuration of a route request message according to the embodiment.
Figure 26:
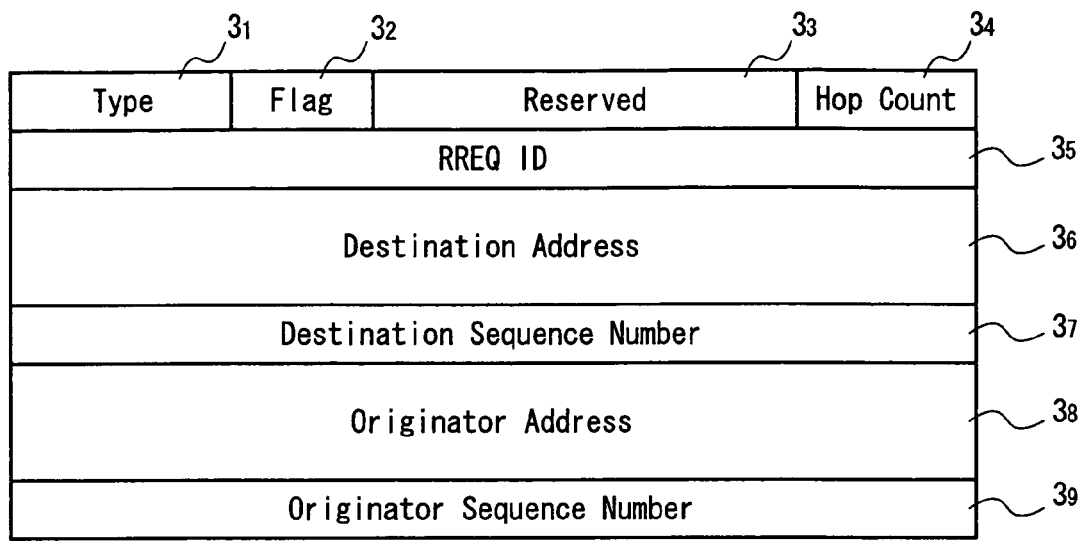
FIG. 26 is a conceptual diagram showing the configuration of a conventional route request message.

To solve this problem, as shown in FIG. 3, the ad-hoc network system 10 extends a conventional route request message 2 (FIG. 26) to provide a field (Relay Node Addresses #1 through #n) 22 for a relay node list 21. Nodes A through E relaying the route request message 20 successively extends the field 22 to successively record its address in the extended field 22. The mutually corresponding parts in FIGS. 3 and 26 are designated by the same reference numerals.

When receiving the route request message 20, each of nodes A through E checks its route request message ID (RREQ ID). The route request message provided with the same route request message ID may have been received and may contain its address in the relay node list 21. In such case, the route request message 20 is discarded.

In this manner, the ad-hoc network system 10 can efficiently and reliably prevent the route request message 20 from looping between nodes A through E. Each of nodes A through E can appropriately create multiple routes up to node S.

Figure 4:
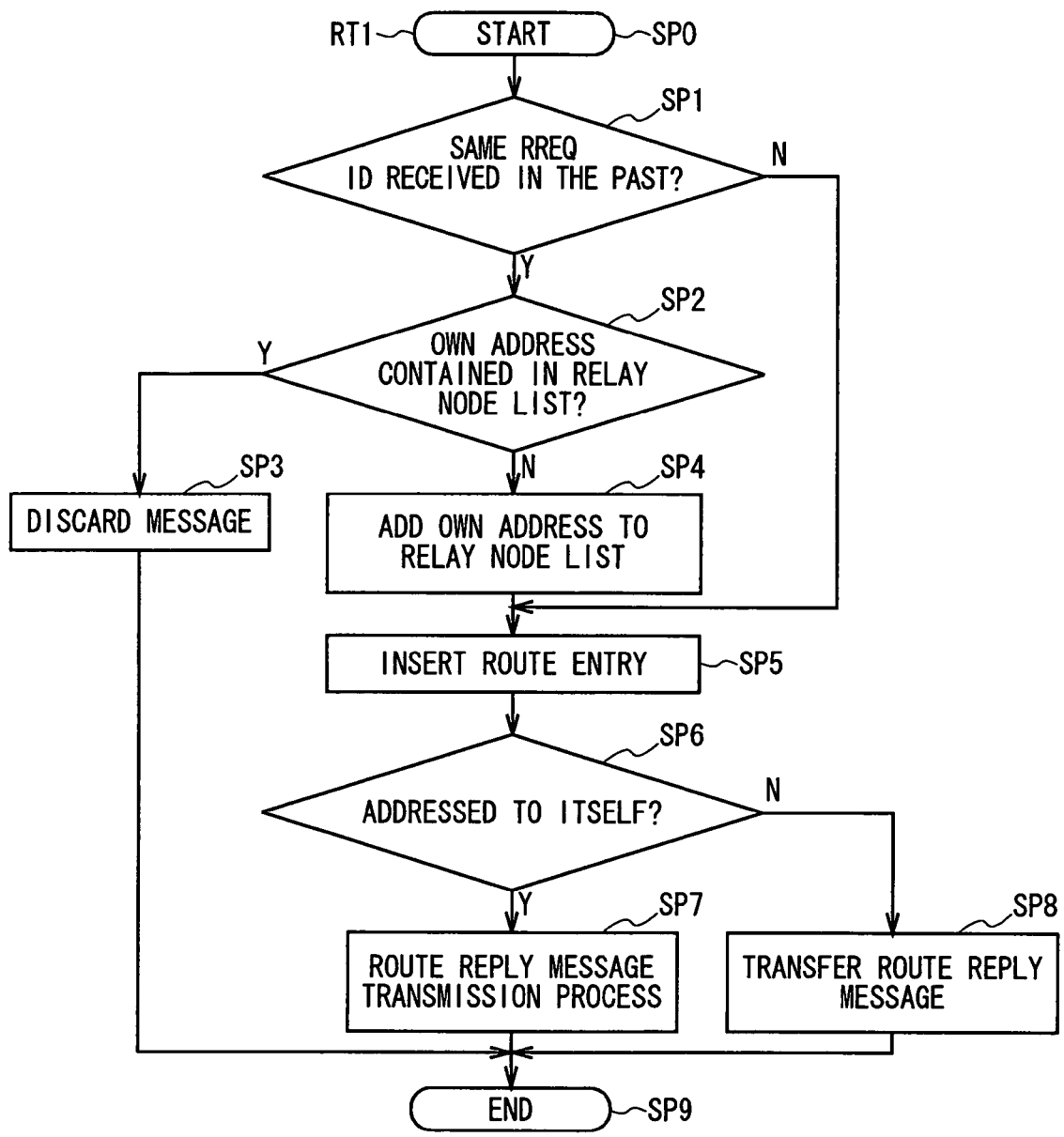
FIG. 4 is a flowchart showing a route request message reception process procedure.

This process is performed under control of the CPU 12 according to a route request message reception process procedure RT1 as shown in FIG. 4. Actually, when receiving the route request message 20, the CPU 12 for each of nodes A through E starts the route request message reception process procedure RT1 at Step SP0. At Step SP1, the CPU 12 reads the route request message ID stored in "RREQ ID" field $3_5$ of the route request message 20. The CPU 12 stores the ID as the reception history of the route request message 20 in the RAM 14. Based on the reception history, the CPU 12 determines whether or not the route request message 20 provided with the same route request message ID was received.

When obtaining a negative result at Step SP1, the CPU 12 proceeds to Step SP5. When obtaining an affirmative result, the CPU 12 proceeds to Step SP2 and determines whether: or not its address is contained in the relay node list 20 of the route request message 20 obtaining the affirmative result at Step SP2 signifies that nodes A through E relayed the route request message 20 itself. At this time, the CPU proceeds to Step SP3 to discard the route request message 20. The CPU 12 then proceeds to Step SP9 to terminate the route request message reception process procedure RT1.

By contrast, obtaining the negative result at Step SP2 signifies that nodes A through E relayed the route request message 20 with the same route request message ID transmitted via the other route but did not relay the route request message 20 itself. At this time, the CPU 12 proceeds to Step SP4 to add its address to the relay node list 20 of the route request message 20.

The CPU 12 then proceeds to Step SP5. The CPU 12 inserts the entry about a reverse path for the route traveled by the route request message 20 as a route to node S into its route table 30 (FIG. 7) according to a route entry insertion process procedure RT2 (FIG. 8) to be described later.

The CPU 12 then proceeds to Step SP6 to determine whether or not the route request message 20 is addressed itself, based on the destination of the route request message 20 described in "Destination Address" field $3_6$ of the route request message 20.

When obtaining a negative result at Step SP6, the CPU 12 proceeds to Step SP7 to increment by "1" the hop count stored in "Hop Count" field $3_4$ of the route request message 20. The CPU 12 broadcasts the route request message 20 and then proceeds to Step SP9 to terminate the route request message reception process procedure RT1.

When obtaining an affirmative result at Step SP6, the CPU 12 proceeds to Step SP8 to create a route reply message 23 (FIG. 6) corresponding to the route request message 20. The CPU 12 unicasts this message to the corresponding nodes C and E based on the CPU's route table 30 (FIG. 7) and then proceeds to Step SP9 to terminate the route request message reception process procedure RT1.

At Step SP8 of the route request message reception process procedure RT1 according to the embodiment, the CPU 12 generates the route reply message 23 provided with the same ID (hereafter referred to as the route reply message ID (RREP ID)) as a response to the route request message 20 provided with the same route request message ID.

Normally, the route reply message is transmitted in a unicast fashion so as to pass through the reverse path established during transmission of the route request message. Since multiple reverse paths are available according to the embodiment, the route reply message 23 is copied for the number of reverse paths for multicast transmission.

Figure 5:
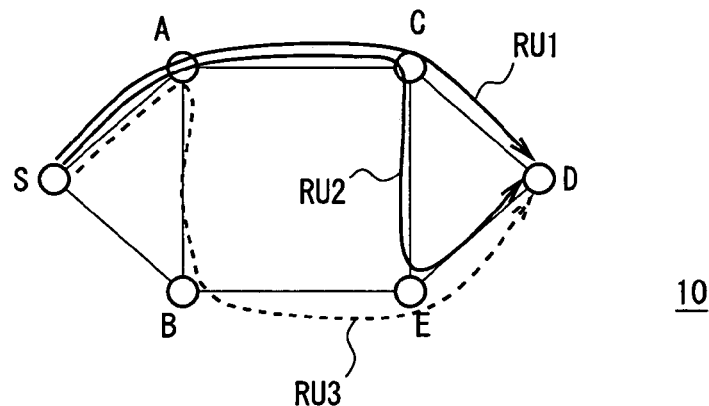
FIG. 5 is a conceptual diagram showing creation of multiple routes from node S to node D.

As shown in FIG. 5, for example, the route request message 20 is issued from node S, passes through three routes (first through third routes RU1 through RU3), and reaches node D. Node D unicasts the route reply message 23 to node C as a response to the route request message 20 reached via the first route RU1. Node D unicasts the route reply message 23 to node E as a response to the route request message 20 reached via the second route RU2. Node D unicasts the route reply message 23 to node E as a response to the route request message 20 reached via the third route RU3. At this time, node E establishes twice the reverse path containing node D as a transmission destination (Destination Address). A similar situation also occurs for nodes A and S.

Figure 6:
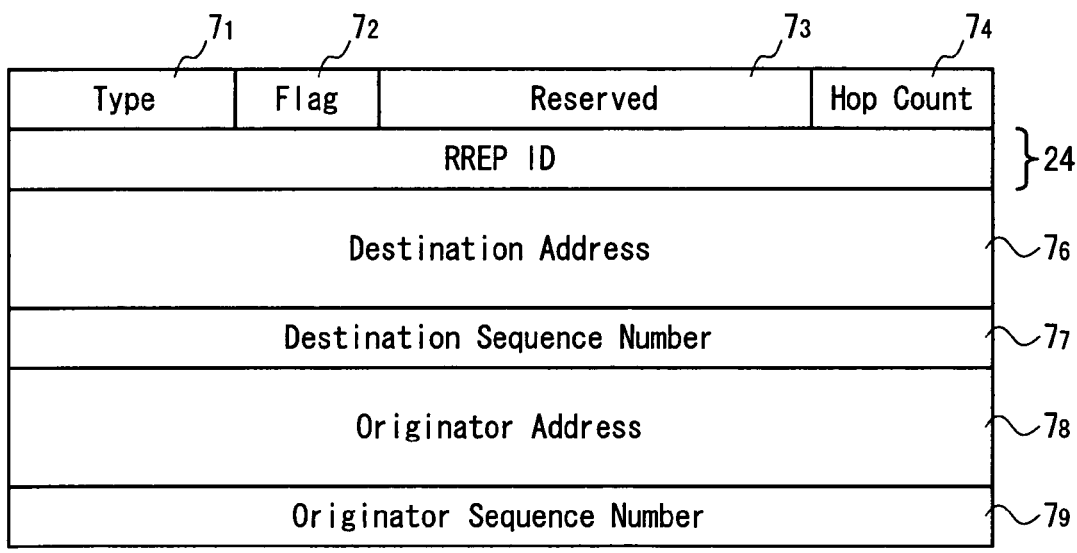
FIG. 6 is a conceptual diagram showing the configuration of a route reply message according to the embodiment.
Figure 28:
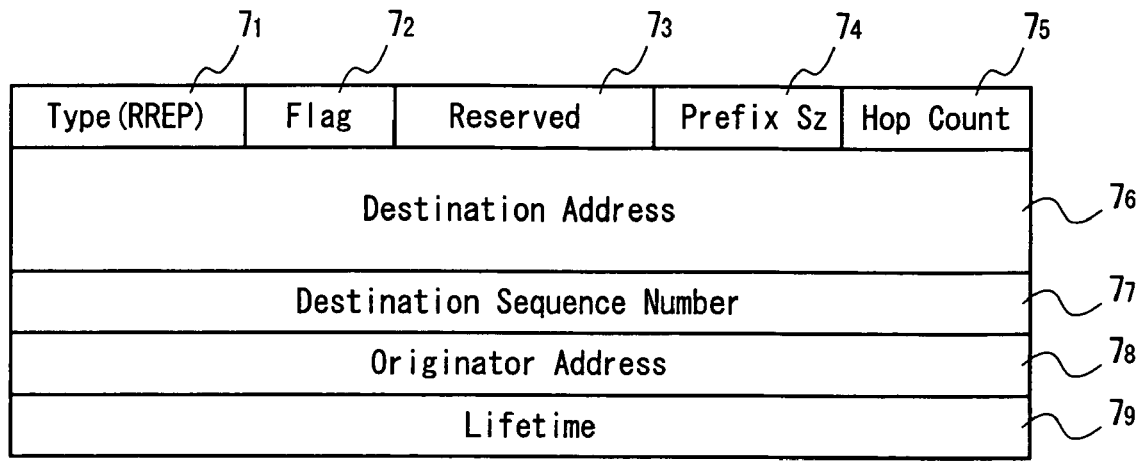
FIG. 28 is a conceptual diagram showing the configuration of a conventional route reply message.
Figure 29:
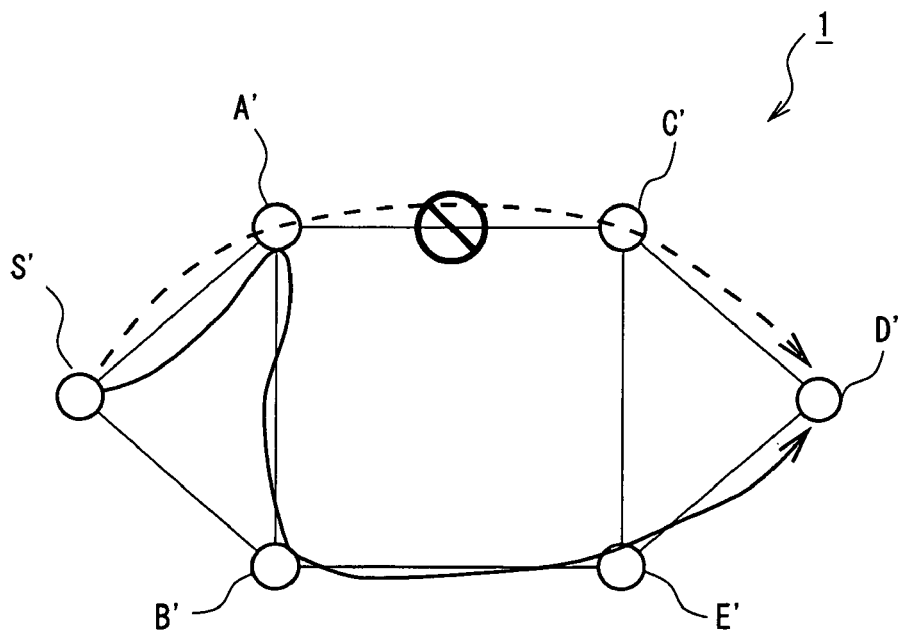
FIG. 29 is a diagram showing a communication route established by the local repair.

To solve this problem, as shown in FIG. 6, the ad-hoc network system 10 extends a conventional route reply message 6 (FIG. 28) to provide an "RREP ID" field 24. When receiving the route request message 20, node D returns the route reply message 23. At this time, node D uses the field 21 to store a route reply message ID similar to the route request message ID in the route request message. The mutually corresponding parts in FIGS. 6 and 28 are designated by the same reference numerals.

When receiving the route reply message 23, nodes A through C, E, and S may have received the route reply message 23 with the same route reply message ID and the route table 30 may already register the reverse path up to node S. In such case, the route reply message 23 is discarded. Otherwise, any of the nodes inserts a route up to node D issuing the route reply message 23 into its route table 30 according to the route entry insertion process procedure RT2 to be described later with reference to FIG. 8.

In this manner, the ad-hoc network system 10 can efficiently prevent duplicate establishment of a reverse path, as might occur during creation of multiple routes, up to a node (node D) transmitting the route reply message 23 and reliably avoid such redundancy.

(1-1-3) Method of Managing Multiple Routes in Nodes A Through E and S

Figure 27:
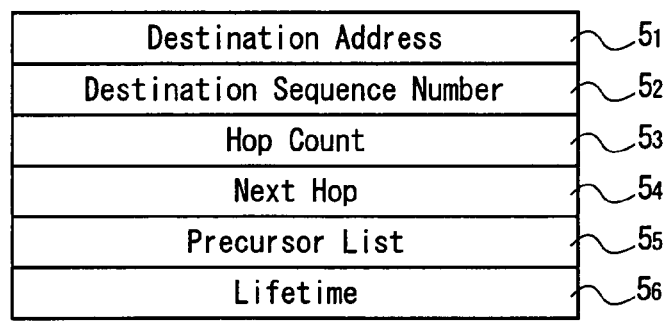
FIG. 27 is a conceptual diagram showing the configuration of a conventional route table.

In the ad-hoc network system 10 as mentioned above, nodes A through E and S create multiple routes at the beginning of data communication between node S as an origin of transmitting data and node D as a transmission destination of the data. Nodes A through E and S use the route table 30 as shown in FIG. 7 to manage the created routes. The mutually corresponding parts in FIGS. 7 and 27 are designated by the same reference numerals.

The route table 30 is composed of fields $5_1$, $5_2$, $31_1$ through $31_3$, and $5_5$ such as "Destination Address", "Destination Sequence Number", "Minimum Hop Count", "Maximum Hop Count", "Route List", and "Precursor List". "Route List" field $31_3$ stores one or more route lists 32 that are created corresponding to routes discovered by the above-mentioned route discovery process for transmission destination nodes A through E and S. "Minimum Hop Count" and "Maximum Hop Count" fields $31_1$ and $31_2$ respectively store the hop count for a route containing the minimum hop count and the hop count for a route containing the maximum hop count out of the routes discovered by the route discovery process.

A route list 32 is composed of "Hop Count", "Next Hop", "Lifetime", and "Link Quality" fields $33_1$ through $33_5$. "Hop Count" field $3_1$, stores the hop count up to transmission destination nodes A through E and S on the route. "Next Hop" field $33_2$ stores the next hop on the route. "Lifetime" field $33_3$ stores the lifetime of the route (next hop). "Link Quality" field $33_4$ stores the route quality. The route list 32 is created each time a new route is discovered, and is stored in the corresponding "Route List" field $31_3$ of the route table 30.

In this case, "Link Quality" field $33_4$ of each route list 32 contains information about the route quality such as the route's electric wave conditions and packet error ratios. The information about the route quality is successively updated each time the route is used.

The life of each route list 32 depends on the lifetime described in "Lifetime" field $33_3$'. When the lifetime expires with the corresponding route unused, the route list 32 is automatically deleted from the route table 30.

Each route list 32 is provided with "Next List" field 335. Field $33_5$ contains a pointer to the route list 32 corresponding to a route whose priority is next higher than that of the corresponding route. Depending on needs, this pointer can be used to retrieve the route list 32 in accordance with priorities.

Generally, it is considered that the best performance is provided by a route capable of reaching transmission destination nodes A through E and D with the shortest hop. Accordingly, the embodiment provides route priorities in ascending order of hop counts.

Figure 8:
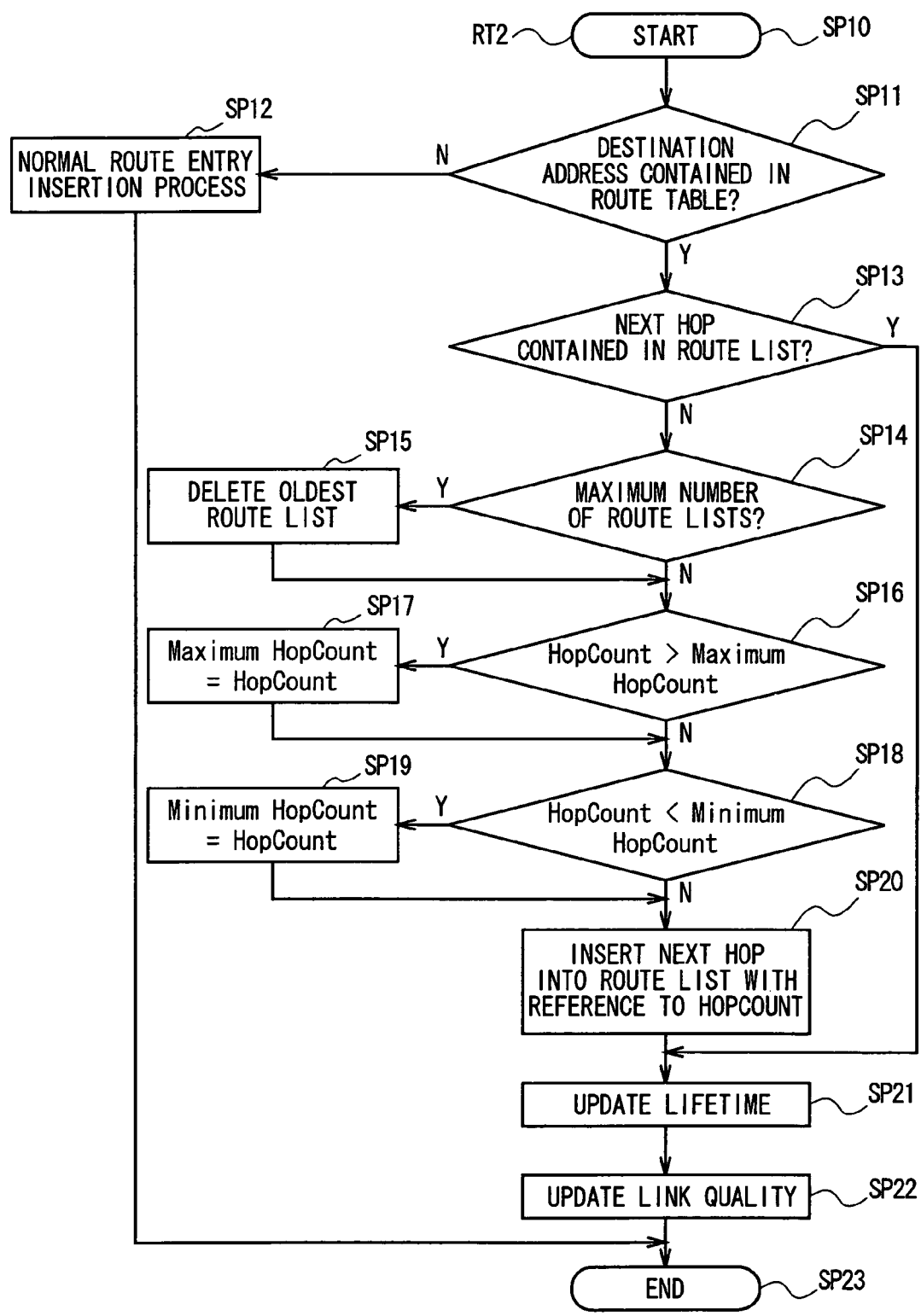
FIG. 8 is a flowchart showing a route entry insertion process procedure.

The CPU 12 of each of nodes A through E and S inserts a new route entry into the route table 30 as mentioned above according to the route entry insertion process procedure RT2 in FIG. 8.

When receiving the route request message 20 (FIG. 3) or the route reply message 23 (FIG. 6), the CPU 12 starts the route entry insertion process procedure RT2 at Step SP10. At Step SP11, the CPU 12 determines whether or not its route table 30 contains the address (Destination Address) of node S or D as a transmission origin node of the route request message 20 or the route reply message 23. The destination address is described in "Destination Address" field $3_6$ (FIG. 3) of the route request message 20 or "Destination Address" field $7_6$ (FIG. 6) of the route reply message 23.

Obtaining the negative result at Step SP11 signifies that any of nodes A through E and S does not register the route up to node S or D in its route table 30 yet. In this case, the CPU 12 proceeds to Step SP12 to perform a normal route entry insertion process.

Specifically, the CPU 12 copies "Originator Address" and "Originator Sequence Number" of the route request message 20 or the route reply message 23 to the corresponding "Destination Address" or "Destination Sequence Number" field $5_1$ or $5_2$ in the route table, respectively. The CPU 12 copies "Hop Count" of the route request message 20 or the route reply message 23 to "Minimum Hop Count" and "Maximum Hop Count" fields $31_1$ and $31_2$ in the route table 30, respectively.

The CPU 12 copies "Hop Count" of the route request message 20 or the route reply message 23 to "Hop Count" field $33_1$, in the route list 32. The CPU 12 copies addresses of adjacent nodes A through E and S transmitting the route request message 20 to "Next Hop" field $33_2$ of the route list 32. Those addresses are contained in the header of a packet that contains the route request message 20 or the route reply message 23. The CPU 12 describes a predetermined lifetime in "Lifetime" field $33_3$. Based on reception states of the route request message 20 or the route reply message 23 at the reception time, the CPU 12 creates the route list 32 by describing the quality such as electric wave conditions and a packet error ratio of the detected route in "Link Quality" field $33_4$. The CPU 12 stores the route list 32 in "Route List" field $31_3$ of the route table 40.

In this manner, at Step SP12, the CPU 12 performs the normal route entry insertion process to register the route to node S or D to its route table 30. The CPU 12 then proceeds to Step SP23 to terminate the route entry insertion process procedure RT2.

By contrast, obtaining an affirmative result at Step SP11 signifies that its own route table 30 already registers one or more routes up to node S or D as the transmission origin of the route request message 20 or the route reply message 23. At this time, the CPU 12 proceeds to Step SP13 to retrieve the route table 30. The CPU 12 then determines whether or not there is the corresponding route list 32 containing "Next Hop" indicative of the adjacent nodes A through E and S that transmitted the route request message 20 or the route reply message 23.

When obtaining an affirmative result at Step SP13, the CPU 12 proceeds to Step SP21. When obtaining a negative result, the CPU 12 proceeds to Step SP14 and determines whether or not the number of route lists is a maximum value capable of being registered to one "Destination Address". When obtaining a negative result at Step SP14, the CPU 12 proceeds to Step SP16. When obtaining an affirmative result, the CPU 12 proceeds to Step SP15. The CPU 12 deletes the earliest route list 32 (marked by the longest time elapsed after creation of the list) from the route list 32 corresponding to the "Destination Address" and then proceeds to Step SP16.

At Step SP16, the CPU 12 determines whether or not the hop count described in "Hop Count" field $3_4$ (FIG. 3) or $7_4$ (FIG. 6) of the route request message 20 or the route reply message 23 is greater than the hop count (maximum hop count) described in the corresponding "Maximum Hop Count" field $31_2$ of the route table 30. When obtaining a negative result at Step SP16, the CPU 12 proceeds to Step SP18. When obtaining an affirmative result, the CPU 12 proceeds to Step SP17 to rewrite the hop count described in the corresponding "Maximum Hop Count" field $31_2$ of the route table 30 to the hop count described in "Hop Count" field $3_4$ (FIG. 3) or $7_4$ (FIG. 6) of the route request message 20 or the route reply message 23. The CPU 12 then proceeds to Step SP18.

At Step SP18, the CPU 12 determines whether or not the hop count described in "Hop Count" field $3_4$ (FIG. 3) or $7_4$ (FIG. 6) of the route request message 20 or the route reply message 23 is smaller than the hop count (minimum hop count) described in the corresponding "Minimum Hop Count" field 311 of the route table 30. When obtaining a negative result at Step SP18, the CPU 12 proceeds to Step SP20. When obtaining an affirmative result, the CPU 12 proceeds to Step SP19 to rewrite the hop count described in the corresponding "Minimum Hop Count" field $31_1$ of the route table 30 to the hop count described in "Hop Count" field $3_4$ (FIG. 3) or 74 (FIG. 6) of the route request message 20 or the route reply message 23. The CPU 12 then proceeds to Step SP20.

At Step SP20, the CPU 12 creates the route list 32 corresponding to the route in the same manner as described at Step SP12 above. The CPU 12 registers the route list 32 to the corresponding "Route List" field $31_3$ in the route table 30. At this time, the CPU 12 determines priorities of the route lists 32 for the same "Destination Address" based on "Hop Count" of each of the route lists 32. Further, the CPU 12 rewrites "Next List" field $33_5$ of the corresponding route lists 32 to a pointer to the route list 32 corresponding to the route having the next priority.

The CPU 12 then proceeds to Step SP21 to update "Lifetime" of the route list 32 newly inserted at Step SP20. The CPU 12 then proceeds to Step SP22 to update "Link Quality" of the route list 32 according to the quality corresponding to a detected route. The CPU 12 then proceeds to Step SP23 to terminate the route entry insertion process procedure RT2.

In this manner, each of nodes A through E and S uses its route table 30 to manage new routes.

(1-1-4) Specific Process Contents of Data Communication Between Nodes A Through E and S Node S as an origin transmits the route request message 20 to node D as a destination and then receives the route reply message 23 in response to the route request message from node D. This signifies establishment of a route from node S to node D.

According to the embodiment, node S receives as many route reply messages 23 as the specified number of routes. The first received route reply message 23 does not always pass through a high-quality route with a small hop count.

Node S is an origin of transmitting the route request message 20 in the ad-hoc network system 10. Node S waits until a predetermined time interval elapses after the first route reply message 23 is received or until a specified number of route reply messages 23 is received. Node S selects a route with the smallest hop count out of routes the received route reply messages 23 have passed through. Using the selected route, node S starts communication with node D as the transmission destination of the route request message 23.

Based on the route reply message ID contained in the route reply message 23, node S determines whether or not the reached route reply message 23 is transmitted from the same node D at the same time. This makes it possible to prevent an incorrect route from being selected.

Figure 9:
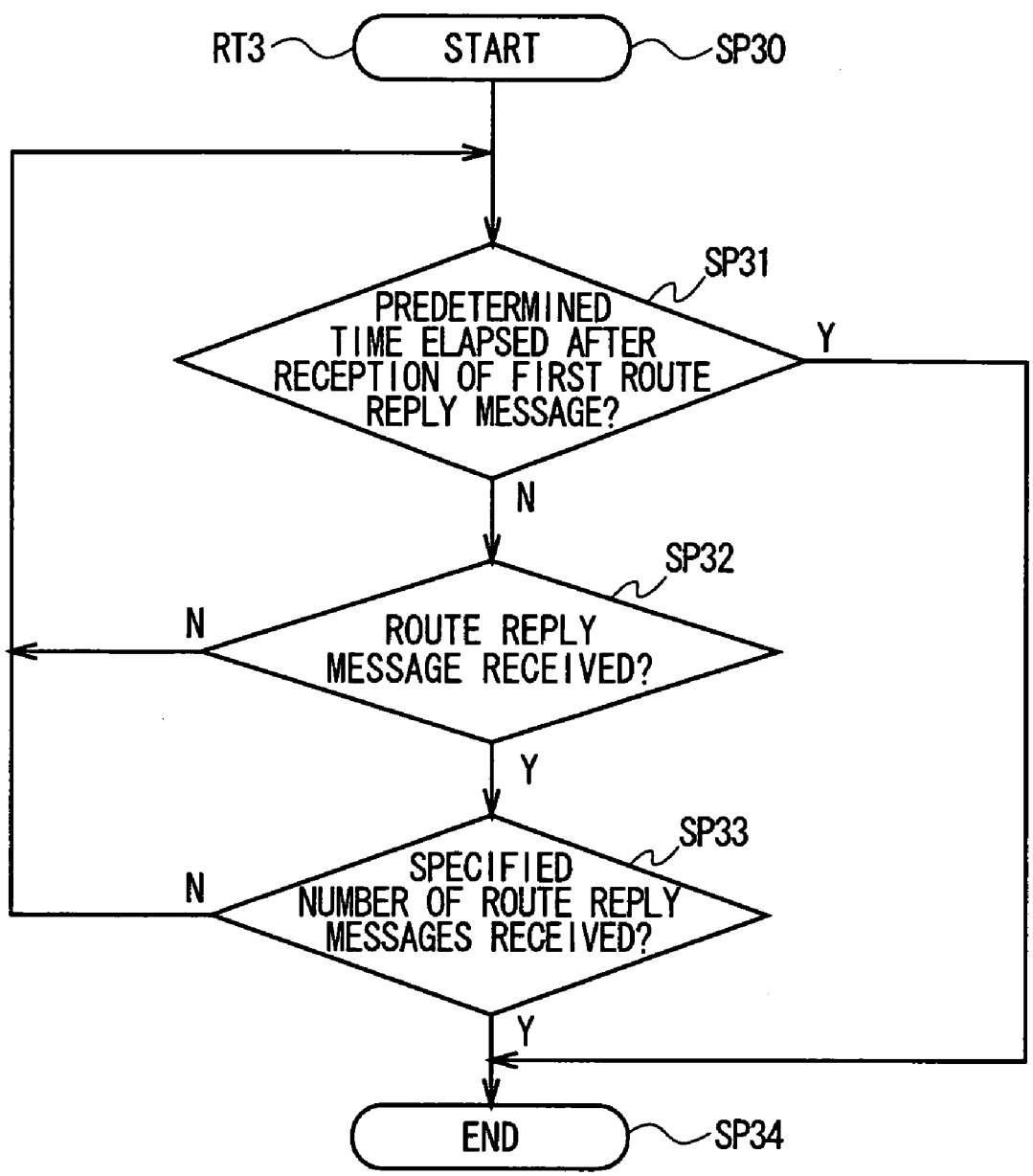
FIG. 9 is a flowchart showing a route reply message reception process procedure.

Such process in node S is performed under control of the CPU 12 (FIG. 2) in accordance with a route reply message reception process procedure RT3 as shown in FIG. 9. When transmitting the route request message 20 and receiving the first route reply message 23, the CPU 12 of node S starts the route reply message reception process procedure RT3 at Step SP30. At Step SP31, the CPU 12 determines whether or not a predetermined time has elapsed after reception of the first route reply message 23.

When obtaining a negative result at Step SP31, the CPU 12 proceeds to Step SP32 to determine whether or not to receive the new route reply message 23. When obtaining a negative result at Step SP32, the CPU 12 the CPU 12 returns to Step SP31.

When obtaining an affirmative result at Step SP32, the CPU 12 proceeds to Step SP33 to determine whether or not to receive a specified number of route reply messages 23 including the first received route reply message 23.

When obtaining a negative result at Step SP33, the CPU 12 returns to Step SP31. The CPU 12 repeats a loop of Steps SP31, SP32, SP33, and SP31 until obtaining an affirmative result at Step SP31 or SP33.

The CPU 12 may wait until a predetermined time interval elapses after the first route reply message 23 is received or may receive a specified number of route reply messages 23. In such case, when obtaining an affirmative result at Step SP31 or SP33, the CPU 12 proceeds to Step SP34 to terminate the route reply message reception process procedure RT3. The CPU 12 then starts unicasting data to nodes A and B whose addresses are registered in "Next Hop" field $33_2$ (FIG. 7) of the most highly prioritized route list 32 registered to the corresponding "Route List" in the route table 30.

When node S starts transmitting data to nodes A through E, each of these nodes retrieves its route table 30 to detect an entry for the route up to the destination node (i.e., node D) for transmitting the data. The node unicasts the data to nodes A through E registered to "Next Hop" field $33_2$ (FIG. 7) in the route list 32 for the most highly prioritized route out of the corresponding detected route lists 32.

Figure 10:
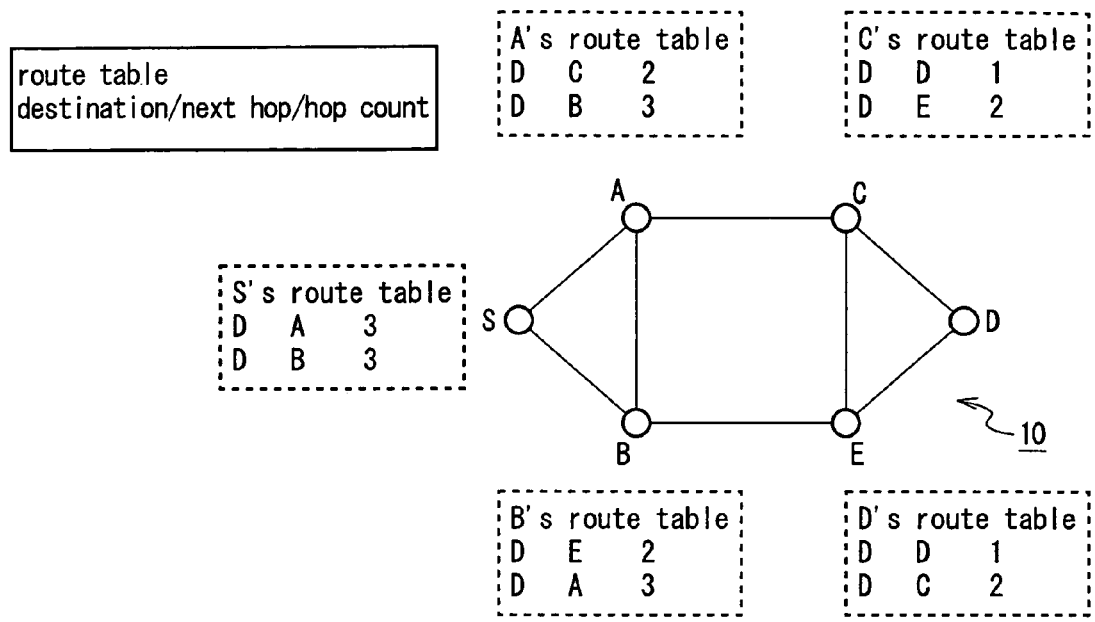
FIG. 10 is a conceptual diagram showing a route table state in each node.

As shown in FIG. 10, for example, let us suppose that nodes A through E and S have established routes and node S transmits data to node A. In this case, node A has the route lists 32 assigned with node D as transmission destination (Destination Address), i.e., the route list assigned with node C as "Next Hop" and the route list 32 assigned with node B as "Next Hop". The route list 32 assigned with node C as "Next Hop" contains a smaller hop count and therefore is more highly prioritized. Accordingly, node A unicasts the data transmitted from node S to node C.

Similarly, node C has the route lists 32 assigned with node D as transmission destination, i.e., the route list assigned with node D as "Next Hop" and the route list assigned with node E as "Next Hop". The route list assigned with node D as "Next Hop" contains a smaller hop count and therefore is more highly prioritized. Accordingly, node C unicasts the data transmitted from node A to node D.

In this example, node S has the route lists 32 assigned with node D as transmission destination, i.e., the route list 32 assigned with node A as "Next Hop" and the route list 32 assigned with node B as "Next Hop". Both route lists 32 have the same "Hop Count". In this case, node S is configured to select an optimum route in consideration for predetermined elements (e.g., route quality (Link Quality)) other than the routes' hop counts.

After the communication starts between node S and node D, a communication error may occur between any of nodes A through E and S constituting the routes the data may travel. Each of nodes A through C, E, and S as the transmission side selects a new route list 32 based on its inherent route table 30 from several route lists 32 contained in the entry whose "Destination Address" corresponds to node D as transmission destination of the data. The new route list 32 should have a priority next to that of the most recently used route. Subsequently, data is transmitted to any of nodes A through E described as "Next Hop" in the route list 32.

In the example of FIG. 10, a communication error may occur between nodes A and C. In this case, node A selects a route passing through node B provided with the priority next to that provided for the route passing through node C. Node A transfers data to node B described in "Next Hop" of the route list 32.

Figure 11:
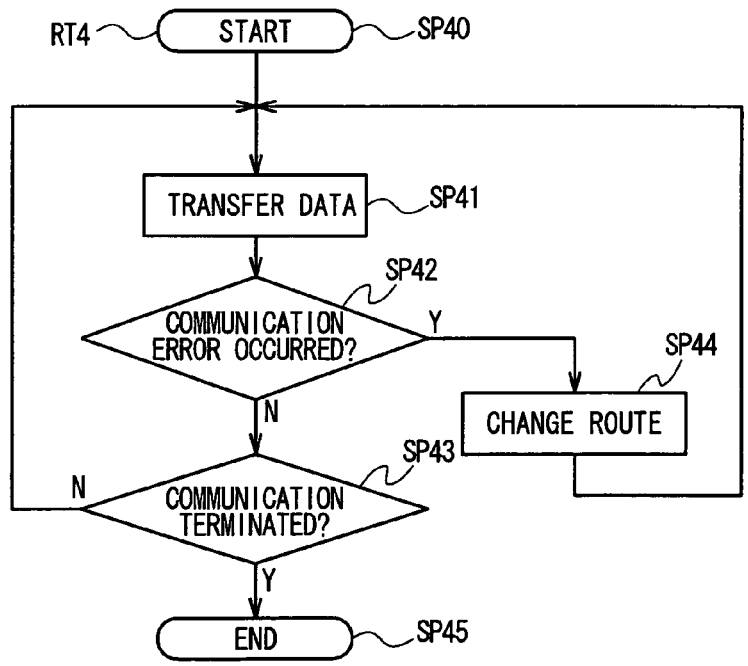
FIG. 11 is a flowchart showing a communication process procedure.

Such process in nodes A through C, E, and S is performed under control of the CPU 12 in accordance with a communication process procedure RT4 as shown in FIG. 11. That is, the CPU 12 for each of nodes A through C, E, and S starts the communication process procedure RT4 at Step SP40 when data transmission stars or data is transmitted. At Step SP41, the CPU 12 unicasts the transmitted data to nodes A through E described in "Next Hop" field 332 (FIG. 7) of the route list 32 for the most highly prioritized route.

The CPU 12 proceeds to Step SP42 to determine whether or not a communication error occurs between the nodes A through E based on electric wave conditions and the like with respect to the nodes A through E as communication parties.

When obtaining a negative result at Step SP42, the CPU 12 proceeds to Step SP43. The CPU 12 determines whether or not the communication between the data transmission origin (node S) and the transmission destination (node D) terminates according to transmission situations of data transmitted from the preceding nodes A through C, E, and S.

When obtaining a negative result at Step SP43, the CPU 12 returns to Step SP41. The CPU 12 repeats a loop of Steps SP41, SP42, SP43, and SP41 until obtaining an affirmative result at Step SP42 or SP43.

When obtaining an affirmative result at Step SP42, the CPU 12 proceeds to Step SP44. The CPU 12 retrieves the route list 32 for a next prioritized route based on a pointer stored in the "Next List" field $33_5$ (FIG. 7) of the route list 32 used so far. The CPU 12 changes the current route list 32 to the retrieved one and then returns to Step SP41. In this manner, the CPU 12 unicasts data to nodes A through E described in "Next Hop" field $33_2$ (FIG. 7) of the route list 32 selected at Step SP44.

When obtaining an affirmative result at Step SP43, the CPU 12 proceeds to Step SP45 to terminate the communication process procedure RT4.

(1-1-5) Activation Method Using a Route Activation Packet

The following describes the activation method (route normalization) using a route activation packet in the ad-hoc network system 1.

As mentioned above, the relay node list 21 is provided by extending the conventional route request message 2 (FIG. 26). Based on the relay node list 21, the ad-hoc network system 1 creates multiple routes for nodes A through E and S by preventing the route request message 20 (FIG. 3) from looping between the relaying nodes A through C and E.

In such route control system that creates multiple route lists, relaying nodes A through C and E to maintain routes are responsible for determining which route to use. Node S, as an origin of transmitting the route request message 20, cannot select routes. Even though node S can select any of routes, all data packets originating from node S as the same transmission origin pass through the same route. It is difficult to efficiently use multiple routes such as using different routes for data attributes (text data, command data, AV data, and the like) and freely changing routes with reference to the link quality that varies with the time.

To solve this problem in the ad-hoc network system 1, nodes A through E and S create multiple routes as mentioned above. After this, node S as data transmission origin originates a packet (hereafter referred to as a route activation packet) that stores a request for the route to be used as a communication route up to node D as data transmission destination. When receiving the route activation packet, each of nodes A through E selects a route to be used from the created routes or provides various settings for the route according to the request stored in the route activation packet. In this manner, each of nodes A through E and S can selectively use an optimum route out of the created routes in accordance with the request from node S as data transmission origin.

Figure 12:
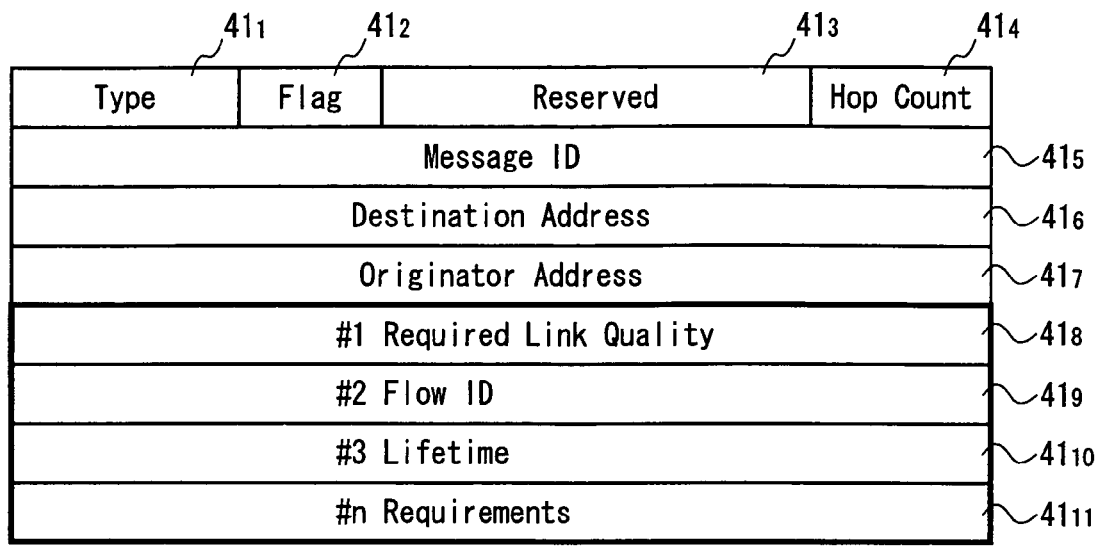
FIG. 12 is a diagram illustrating a route activation packet.

FIG. 12 shows the configuration of a route activation packet 40. As will be understood from FIG. 12, the route activation packet 40 is composed of fixed fields and variable fields that may be added or deleted depending on requests for a route to be used. The fixed fields include "Type", "Flag", "Reserved", "Hop Count", "Message ID", "Destination Address", and "Originator Address" fields $41_1$ through $41_7$. The variable fields include "Required Link Quality", "Flow ID", "Lifetime", and "Requirements" fields $41_8$ through $41_{11}$.

"Type" field $41_1$ of the route activation packet 40 stores a code indicating whether the packet is a route activation packet (RACT) or a route activation acknowledgment packet (RACT-ACK), to be described later, as a response to the route activation packet.

"Flag" field $41_2$ stores a flag used for debugging and the like. The route activation packet 40 is originated from the data transmission origin to the transmission destination. In principle, the data transmission destination issues a route activation acknowledgment packet as a response to the route activation packet 40 to the data transmission origin as will be described later. A flag may be predetermined to establish a route in either direction only.

The use of the route activation packet 40 makes it possible to freely change between multiple routes created at the beginning of communication even during the communication. That is, routes can be changed not only when the communication already starts, but also when nodes move in an ad-hoc network. "Hop Count" field $41_4$ stores the hop count (initially "0"). "Message ID" field 415 stores an ID (hereafter referred to as a message ID) provided for the route activation packet 40. The message ID is unique to one route activation packet. The same message ID is used even for retransmission.

"Destination Address" field 416 of the route activation packet 40 stores the address of a destination node for the route activation packet 40. "Originator Address" stores the address of a node that issued the route activation packet 40.

"Required Link Quality" field $41_8$ of the route activation packet 40 stores a value specified as a threshold value for the quality of a route requested as the communication route. "Flow ID" field $41_9$ stores an ID (hereafter referred to as a flow ID) specified for the route. The flow ID is used, for example, so that different data flows directed to the same transmission destination can be efficiently transferred using different routes.

"Lifetime" field $41_{10}$ of the route activation packet 40 stores the lifetime to be specified for the route and is used to extend the lifetime of the route that is unused and is going to be deleted soon. "Requirements" field $41_{11}$ is used to describe any requirements for the route.

These "Required Link Quality", "Flow ID", "Lifetime", and "Requirements" fields $41_8$ through $41_{11}$ are added or omitted as needed according to conditions required for the communication route. "Required Link Quality", "Flow ID", "Lifetime", and "Requirements" fields $41_8$ through $41_{11}$, store contents of requirements for a route to be used. These contents are collectively referred to as a route requirement parameter in the following description.

A route requirement parameter value is configured in accordance with a request from an application that commanded data transmission from the node as an origin of data transmission. Alternatively, it is configured based on data transmission states when the route activation packet 40 is frequently retransmitted or when a packet loss occurs at a high rate during transmission.

(1-1-6) Example of Using the Route Activation Packet 40

The following example of using the route activation packet 40 describes a case of activating only a route having specific route quality. In the description to follow, the route quality is defined as a value resulting from abstracting wireless electric wave situations and error rates. That is, it is assumed that a large value represents high route quality and a low error rate for the route.

Node S, as data transmission origin, determines a request for the route. With respect to the route quality, for example, node S previously uses statistical information to investigate the environment capable of satisfactory communication. With respect to the other complicated information such as a flow ID, node S obtains a request by providing an interface with an application so as to accept requests from the application.

For example, an application commanding data transmission may issue a request to "activate only routes whose route quality is greater than or equal to threshold value 50". In such case, node S stores value "50" in "Required Link Quality" field $41_5$ of the route activation packet 40. Further, node S stores an address of node D as data transmission destination in "Destination Address" field $41_6$. Node S generates the route activation packet 40 so as to store its own address in "Originator Address" field $41_7$ and originates the packet.

On the other hand, each of the other nodes A through E receives the route activation packet 40 and checks whether or not its own route table 30 (FIG. 7) contains the route entry corresponding to the destination (node D in this example, i.e., a node whose address is stored in "Destination Address" field $41_6$). When such entry is unavailable, the node transmits a route activation error to node S as transmission origin of the route activation packet 40.

When the route table 30 contains such route entry, nodes A through E retrieve the route list 32 (FIG. 7) for the destination to determine whether or not there is a route whose route quality ("Link Quality") exceeds the threshold value ("50") stored in "Required Link Quality" field $41_5$ of the route activation packet 40.

When such route is unavailable, nodes A through E transmit a route activation error to node S. It is possible to substitute an IP layer's ICMP message for the route activation error.

When there is at least one route having the quality that exceeds the threshold value, the nodes A through E assume nodes A through E described in "Next Hop" field $32_2$ of the route's route list 32 to be qualified routes for data transmission from node S to node D.

What qualifies a route depends on the route control system of the ad-hoc network system 1. For example, there is a system that has multiple routes but usually enables only one "Valid" flag. Such system activates a route by "validating" only the corresponding route and "invalidating" the remaining routes. Since the ad-hoc network system 1 assigns priorities to routes, a route can be qualified by increasing the priority assigned to the route.

When completing activation of the route, each of nodes A through E ensures that the route activation packet 40 is addressed to itself. In this case, nodes A through E increment by "1" the hop count stored in "Hop Count" field $41_4$ of the route activation packet 40. Nodes A through E then transfer the route activation packet 40 to any of nodes A through E as the next hop for the activated route.

A similar process is subsequently performed for each of corresponding nodes A through C and E successively. The route activation packet 40 is finally delivered to node D as destination.

Node D receives the route activation packet 40 and activates the route as mentioned above. Node D changes the code stored in "Type" field $41_1$ of the route activation packet 40 to the code for a route activation acknowledgment packet. Node D changes the address stored in "Destination Address" field $41_6$ to the address of node S as transmission origin of the route activation packet 40. Node D changes the address stored in "Originator Address" field $41_7$ to its own address. In this manner, node D generates a route activation response packet 50 and transfers it to nodes C and E as next hops on the activated route.

Similarly to the route activation packet 40, the route activation acknowledgment packet 50 is successively transmitted to node S while nodes A through C and E activate the route to node D. Node S finally receives the route activation acknowledgment packet 50 to complete the route activation. In the communication between nodes S and D, there may be transmitted data assigned with the flow ID stored in the route activation packet 40. In such case, nodes A through E exchange the data using the established route as the communication route. In this manner, the ad-hoc network 10 establishes an appropriate route in accordance with requests and the like of an application in the node as data transmission node.

After transmitting the route activation packet 40, node S may not able to receive the route activation acknowledgment packet 50 from node D within a specified time. Alternatively, node S may receive a route activation error in the middle of the process. In such cases, node S retransmits the route activation packet 40 by reconfiguring the route requirement parameter so as to gradually relieve conditions until the route is activated.

According to this example, the route quality set to a value greater than or equal to "50" is the route activation condition at the beginning. When retransmitting the route activation packet 40, node S successively generates route activation packets 40 by decrementing the threshold value stored in "Required Link Quality" field 418 of the route activation packet 40 from "50" and retransmits the generated packets.

There has been described the example of activating only the route having the specific route quality. Similar processes are performed for the other requests as follows. For example, a specified flow ID may be assigned to the route. The lifetime may be assigned to the route. There may be a case of activating a route that satisfies a given condition requested by a user and the like. Further, there may be a case of activating a route that satisfies all of two or more specified conditions, or another case of providing the route with specified settings.

Actually, when assigning a specified flow ID on the route, node S stores that flow ID in "Flow ID" field $41_9$ of the route activation packet 40. When activating a route having the lifetime greater than or equal to a specified time, node S stores the route's minimum required lifetime in "Lifetime" field $41_{10}$. When activating a route that satisfies any other conditions requested by a user and the like, node S stores the conditions in "Requirements" field $41_{11}$. In this manner, node S generates the route activation packet 40 and originates it.

When receiving the route activation packet 40, nodes A through E establish the route satisfying all requests stored in the route activation packet 40 as a communication route between nodes S and D. Further, nodes A through E update the route's lifetime, assign a flow ID to the route, and the like. Subsequently, node S successively transmits data to node D using that route.

In the ad-hoc network 10, the data transmission origin can establish a route to be used according to application's requests or specified route quality, update the route's lifetime, and assign a flow ID to the route. In this manner, it is possible to finely establish or maintain routes according to data attributes.

(1-1-7) Process of CPU 12 During Route Activation

Figure 13:
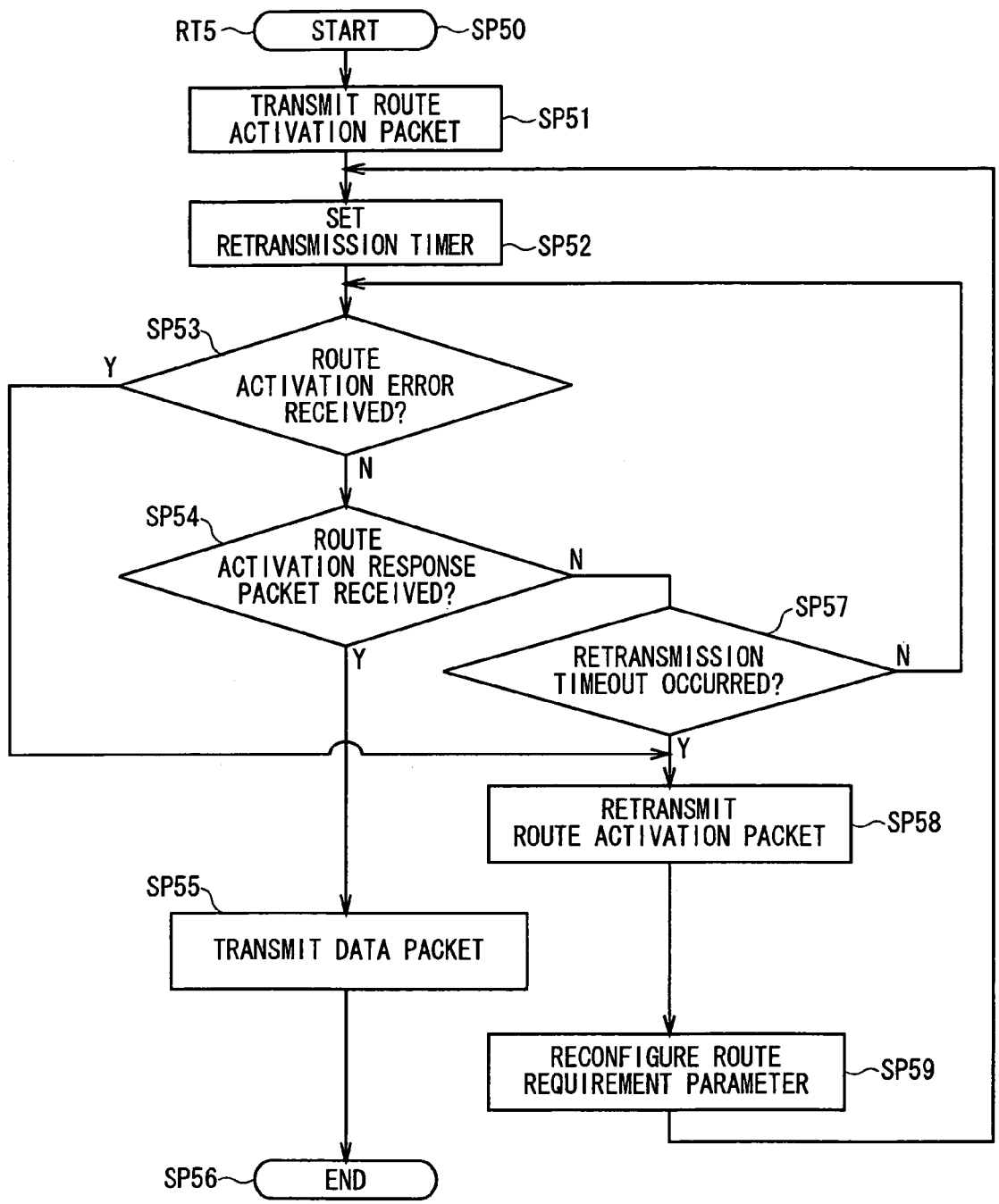
FIG. 13 is a flowchart showing a route activation packet transmission process procedure.

During the route activation, the above-mentioned various processes in nodes A through E are performed under control of the CPU 12 (FIG. 2) in accordance with a route activation packet transmission process procedure RT5 as shown in FIG. 13.

Actually, in node S as transmission origin of the route activation packet 40, the CPU 12 receives a request to activate a route that is specified in accordance with a user request or a data packet's transmission state. The CPU 12 then starts the route activation packet transmission process procedure RT5 at Step SP50. At Step SP51, the CPU 12 transmits the route activation packet 40 in accordance with the activation request. The CPU 12 proceeds to Step SP52 to start the timer 16 (FIG. 2) based on the transmission time.

The CPU 12 proceeds to Step SP53 to determine whether or not to receive a route activation error according to a specified system. When obtaining an affirmative result at Step SP53, the CPU 12 proceeds to Step SP54 to determine whether or not to receive the route activation acknowledgment packet 50.

Obtaining an affirmative result at Step SP54 signifies that node S receives the route activation acknowledgment packet 50 to successfully bidirectionally activate the route. At this time, the CPU 12 proceeds to Step SP55 to start data transmission via the activated route. The CPU 12 then proceeds to Step SP56 to terminate the route activation packet transmission process procedure RT5.

Obtaining an negative result at Step SP54 signifies that the route activation acknowledgment packet 50 is not received yet. At this time, the CPU 12 proceeds to Step SP57 to determine whether or not a predetermined timeout is exceeded based on a count value of the timer 16 (FIG. 2).

Obtaining an affirmative result at Step SP57 signifies that a timeout occurs. At this time, the CPU 12 proceeds to Step SP58 to retransmit the route activation packet 40. The CPU 12 proceeds to Step SP59 to reconfigure the route requirement parameter as needed. The CPU 12 returns to Step SP52 to repeat the same process.

Obtaining a negative result at Step SP57 signifies that no timeout occurs. At this time, the CPU 12 returns to Step SP53 to successively repeat the same process from the step of determining whether or not to receive a route activation error.

Obtaining an affirmative result at Step SP53 signifies that the CPU 12 receives a route activation error. In this case, the CPU 12 proceeds to Step SP58 to retransmit the route activation packet 40.

In this manner, the CPU 12 of node S as transmission origin of the route activation packet 40 activates routes corresponding to the other nodes A through E according to a user request and the like.

Figure 14:
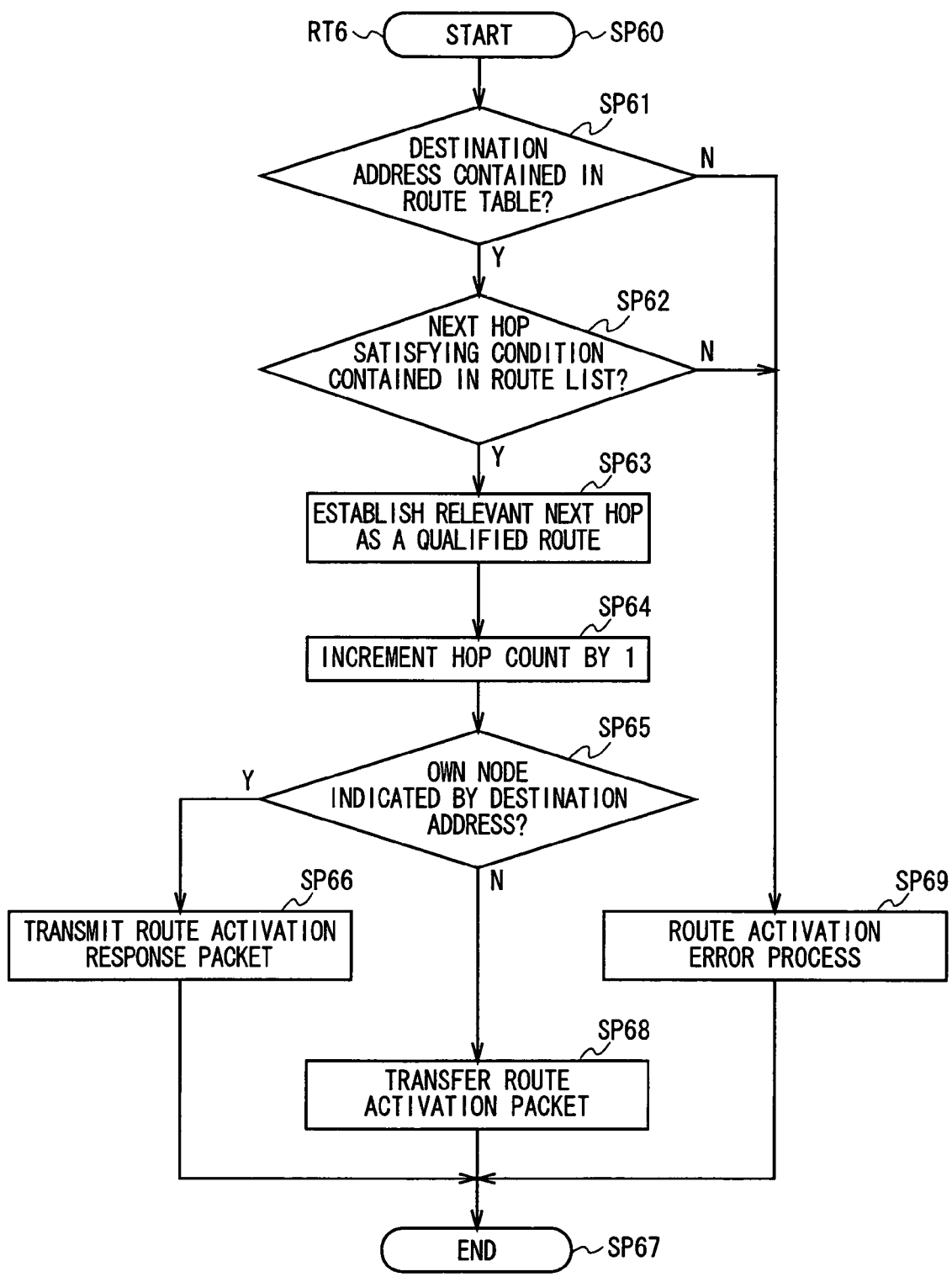
FIG. 14 is a flowchart showing a route activation packet reception process procedure.

On the other hand, the CPU 12 of nodes A through E receives the route activation packet 40 and activates routes according to a route activation packet reception process procedure RT6 in FIG. 14.

When receiving the route activation packet 40, the CPU 12 of nodes A through E starts the route activation packet reception process procedure RT6 at Step SP60. At Step SP61, the CPU 12 determines whether or not its own route table 30 (FIG. 7) contains a route entry to the destination of the route activation packet 40 based on an address stored in "Destination Address" field $41_6$ of the route activation packet 40.

When obtaining an affirmative result at Step SP61, the CPU 12 proceeds to Step SP62 to determine whether or not there is available a next hop corresponding to the route requirement parameter in each route list 32 contained in the route entry. That is, the CPU 12 determines whether or not the route to the destination of the route activation packet 40 contains a route that satisfies all conditions such as the route quality specified as the route requirement parameter.

Obtaining an affirmative result at Step SP62 signifies that there is a route satisfying the condition specified as the route requirement parameter. At this time, the CPU 12 proceeds to Step SP63 to establish the next hop (route) as a qualified route and provide the route with necessary settings such as the lifetime. The CPU 12 then proceeds to Step SP64 to increment by "1" the hop count stored in "Hop Count" field $41_4$ of the route activation packet 40.

The CPU 12 proceeds to Step SP65 to determine whether or not the route activation packet 40 is destined for a node based on an address stored in "Destination Address" field $41_6$ of the route activation packet 40. When obtaining an affirmative result, the CPU 12 proceeds to Step SP66 to generate the route activation acknowledgment packet 50 for the route activation packet 40. The CPU 12 transmits the route activation acknowledgment packet 50 to nodes C and E of the activated route. The CPU 12 proceeds to Step SP67 to terminate the route activation packet reception process procedure RT6.

When obtaining a negative result at Step SP65, the CPU 12 proceeds to Step SP68 to transmit (unicast) the route activation packet 50 to nodes A through E of the activated route. The CPU 12 proceeds to Step SP67 to terminate the route activation packet reception process procedure RT6.

On the other hand, obtaining a negative result at Step SP61 signifies that its own route table 30 (FIG. 7) contains no route entry to the destination node (node D) for the route activation packet 40. At this time, the CPU 12 proceeds to Step SP69 to transmit a route activation error to node S as transmission origin of the route activation packet 40. The CPU 12 then proceeds to Step SP67 to terminate the route activation packet reception process procedure RT6.

Obtaining a negative result at Step SP62 signifies that the route list 30 does not contain a next hop (route) that satisfies the condition specified as the route requirement parameter. The route list 30 is included in the route entry up to the destination node (node D) for the route activation packet 40 registered to the route table 30 for the CPU 12. At this time, the CPU 12 proceeds to Step SP69 to transmit a route activation error to node S as transmission origin of the route activation packet 40. The CPU 12 proceeds to Step SP67 to terminate the route activation packet reception process procedure RT6.

When receiving the route activation packet 40 as mentioned above, the CPU 12 of nodes A through E activates routes corresponding to the route requirement parameter contained in the route activation packet 40.

(1-2) Operations and Effects of the First Embodiment

According to the above-mentioned configuration, the ad-hoc network system 10 allows nodes A through E and S to establish multiple routes at the beginning of data communication. The ad-hoc network system 10 assigns priorities to the routes and performs communication to transmit data using the most highly prioritized route.

For example, a communication error may occur between nodes A through E and S while exchanging realtime stream data such as VoIP and moving images. In such case, the ad-hoc network system 10 can provide stable communication by fast selecting an alternative route.

According to the above-mentioned configuration, each of nodes A through E and S establishes multiple routes at the beginning of data communication. These routes are prioritized. The most highly prioritized route is used to transmit data for communication. When a communication error occurs between nodes A through E and S, the failed route can be fast switched to another for stable communication. Consequently, it is possible to provide the highly reliable ad-hoc network system.

In the ad-hoc network system 1, each of nodes A through E and S establishes multiple routes at the beginning of data communication, and then node S as data transmission origin originates the route activation packet 40 that stores the route requirement parameter corresponding to an application request and the like. Based on the route requirement parameter contained in the route activation packet 40, each of nodes A through E that receives the route activation packet 40 establishes a route satisfying the condition as the communication route and provides necessary settings for the route.

Accordingly, the ad-hoc network system 10 makes it possible to freely configure a route out of the multiple routes created by nodes A through E and S at the beginning of data communication so as to comply with requests from a data transmission origin's application, data packet attributes, and the like. As a result, an optimum route can be used.

According to the above-mentioned configuration, each of nodes A through E and S establishes multiple routes at the beginning of data communication. Node S as data transmission origin originates the route activation packet 40 that stores the route requirement parameter corresponding to application requests and the like. When receiving the route activation packet 40, each of nodes A through E establishes a route satisfying the condition as the communication route or provides necessary settings for the route based on the route requirement parameter contained in the route activation packet 40. Consequently, it is possible to establish an optimum route to be used and provide the highly reliable ad-hoc network system.

(1-3) Other Embodiments

While the above-mentioned embodiment has described the case where the present invention is applied to the AODV protocol ad-hoc network 10 and nodes A through E and S constituting the network, the present invention is not limited thereto. The ad-hoc network 10 may be composed of multiple communication terminals. A first message may be transmitted from a first communication terminal to a third communication terminal via a second communication terminal. In response to the first message, a second message may be transmitted from the third communication terminal to the first communication terminal via the second communication terminal. Based on these messages, the first through third communication terminals may create routes to the first or third communication terminal. The created routes may be used for communication between the first and third communication terminals. The present invention can be widely applied to such communication system and a communication terminal device constituting the communication system.

According to the above-mentioned embodiment, the communication function block 11 for nodes A through E and S is configured as shown in FIG. 2. The communication function block 11 has the following functions of: a route creation means for duplicatively receiving such messages as the route request message 20 (FIG. 3) and the route reply message 23 (FIG. 6) to create multiple routes to its transmission origin; a route management means for storing and managing multiple created routes; and a communication means for performing communication with the other nodes A through E and S. While the embodiment has been described as such, the present invention is not limited thereto. The present invention can be applied to the other various configurations.

While the above-mentioned embodiment has described the case where the hop count is used as a reference to assign priorities and a high priority is given to a route having the small hop count, the present invention is not limited thereto. The route quality may be used as a reference. For example, the reference may be determined by combining the hop count and the route quality. Further, various references can be widely adopted depending on purposes of use.

In this manner, routes may be prioritized using criteria other than the hop count as the reference. In this case, each of nodes A through E and S just needs to use "Minimum Hop Count" and "Maximum Hop Count" fields $31_1$ and $31_2$ of the route table 30 (FIG. 7) to store minimum and maximum values of the reference for each of the created routes.

While the above-mentioned embodiment has described the case where a priority is statically assigned to a route according to the route's hop count, the present invention is not limited thereto. The reference may be dynamically changed based on communication states or the route quality such as a packet error ratio to accordingly reassign a priority to each route.

While the above-mentioned embodiment has described the case where each of nodes A through E and S manages multiple created route entries in a list, the present invention is not limited thereto. For example, it may be preferable to use a table to manage the entries for multiple routes in a combined fashion. As described in the embodiment, however, the use of the list format for each route provides an advantage of easily sorting routes according to priorities.

While the above-mentioned embodiment has described the case where each route maintains entries of each route list 32 such as the hop count for the route, the next hop, the lifetime, the route quality, and the pointer to the next route list, the present invention is not limited thereto. It may be preferable to maintain the other information about the route by supplementing or replacing those pieces of information.

While the above-mentioned embodiment has described the case where the route request message 20 uses the format as shown in FIG. 3 and each of nodes A through C and E relaying the route request message 20 successively extends the field 22 of the relay node list 21 to describe its own address in the relay node list 21, the present invention is not limited thereto. The route request message 20 may be formatted otherwise. Each of nodes A through C and E relaying the route request message 20 may describe information other than its address such as any identification information capable of identifying itself in the network system.

While the above-mentioned embodiment has described the case where the route reply message 23 uses the format as shown in FIG. 6 and "RREP ID" field 24 of the route reply message 23 stores the transmission origin node address, the present invention is not limited thereto. The route reply message 23 may be formatted otherwise. The transmission origin may use "RREP ID" field 24 to describe information other than its address such as any identification information capable of identifying itself in the network system.

According to the above-mentioned embodiment, node S as transmission origin of data uses the route activation packet 40 to store route requests about a route used for communication with node D as transmission destination of the data. Node D uses the route activation acknowledgment packet 50 as a response to the route activation packet 40. While the embodiment has described the case where the format as shown in FIG. 12 is used for the route activation packet 40 and the route activation acknowledgment packet 50, the present invention is not limited thereto. The other various formats are applicable.

While the above-mentioned embodiment has described the case where the route activation packet 40 stores route requirement parameters such as the route quality, the flow ID assigned to the route, the lifetime assigned to the route, and requests from the application and the like, the present invention is not limited thereto. It is also possible to use the other various conditions and items to be assigned to the route.

According to the above-mentioned embodiment, the communication function block 11 for nodes A through E and S is configured as shown in FIG. 2 and functions as follows. When the current node is a transmission origin of data, the communication function block 11 functions as a route request transmission means for transmitting route requests (route requirement parameters), i.e., requests for the route such as the route quality. When the current node is a relaying node, the communication function block 11 functions as a route creation means and a route establishment means. The route creation means creates multiple routes up to the data transmission origin and the transmission destination by duplicatively receiving the route request message 20 as a first message and the route reply message 23 as a second message. Of these routes, the route establishment means establishes the route satisfying the route request transmitted from node S as a communication route between nodes S and D. When the current node is a transmission destination node for data, the communication function block 11 functions as a response origination means for originating the route activation acknowledgment packet 50 as a response to the route activation packet 40 when received. While the embodiment has been described as such, the present invention is not limited thereto. It is possible to widely use the other various configurations.

Figure 15:
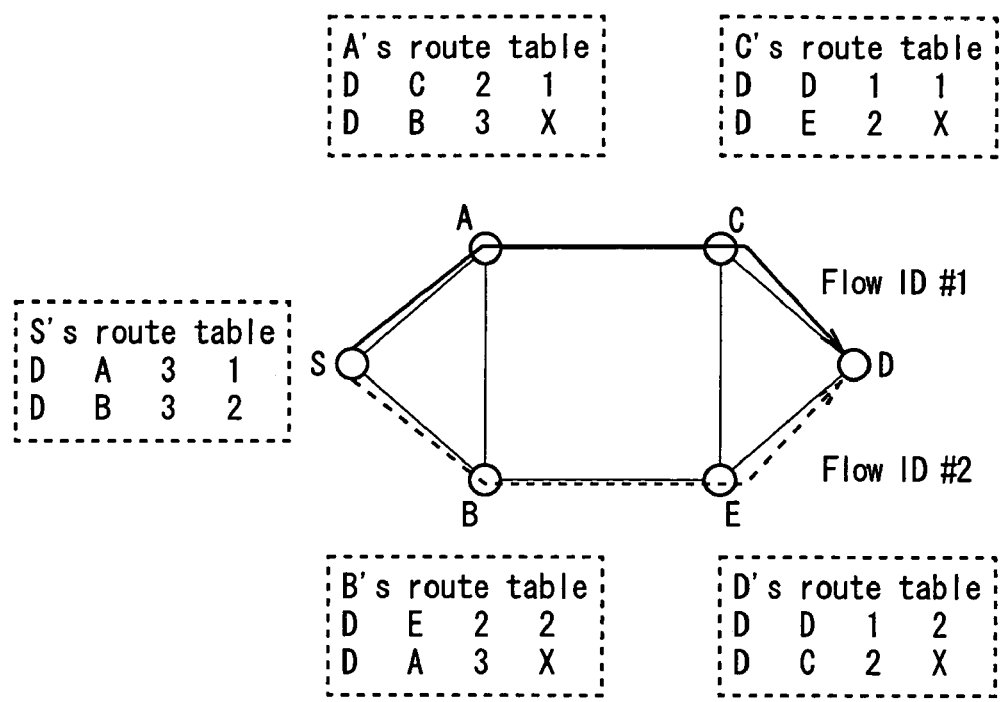
FIG. 15 is a diagram showing different routes specified for flow IDs.

While the above-mentioned embodiment has described the case where only one communication route is established between node S as data transmission origin and node D as transmission destination of the data, the present invention is not limited thereto. For example, as shown in FIG. 15, it may be preferable to establish multiple communication routes with different flow IDs and appropriately use these communication routes according to data attributes and the like. This makes it possible to efficiently use wireless frequencies and, as a result, improve the throughput.

While the above-mentioned embodiment has described the case where the present invention is applied to establishment of a communication route between nodes S and D, the present invention is not limited thereto. For example, the present invention may be used for route maintenance.

Generally, a long-unused route in the ad-hoc network is often automatically deleted. Even when the routing protocol is used to establish multiple routes, there are many routes that remain unused and are deleted from the route table in the long run. This problem can be solved by periodically activating a route to update the route's lifetime.

Actually, in this case, "Lifetime" field 4110 of the route activation packet 40 is used to store the intended lifetime to be assigned newly. Nodes A through E and S just need to perform the route activation packet transmission process procedure RT5 as mentioned above with reference to FIG. 13 and the route activation packet reception process procedure RT6 as mentioned above with reference to FIG. 14. In this case, it is a good practice to multicast the route activation packet 40 to nodes A through E and S corresponding to each of routes for which the route list 32 is registered, not to unicast the same to the destination node. The destination node just needs to respond to the first received route activation packet 40. In this manner, it is possible to efficiently use multiple routes by periodically update the route's lifetime.

The route activation packet 40 may be used to collect statistical information about routes. For example, the route activation packet 40 or the route activation acknowledgment packet 50 may be provided with a field to store the sum of route quality values and increment these values for routes passing through nodes A through C and E on a hop basis. Node S as transmission origin of the route activation packet 40 can obtain an average value of the route quality between nodes by dividing the sum by the hop count. Node S may use the average value when multiple routes are activated.

While the above-mentioned embodiment has described the case where the unidirectional communication is performed from node S to node D, the present invention is not limited thereto. The present invention can be applied to bidirectional communication between nodes S and D. In this case, based on the route activation packet 40 and the route activation acknowledgment packet 50, the CPU 12 of each of nodes A through E and S may independently establish a communication route from node S to node D and a communication route from node D to node S differently from each other. This makes it possible to provide efficient communication between nodes S and D. As a specific technique to do this, each of nodes A through C, E, and S, when receiving the route activation acknowledgment packet 50, determines whether or not its own route table 30 already qualifies (establishes) the route to node S as the transmission destination. When the route is qualified, it just needs to select another route to node D as the transmission origin.

(2) Second Embodiment

The following describes the second embodiment of the present invention in detail.

(2-1) Configuration of an Ad-Hoc Network System 60

Figure 16:
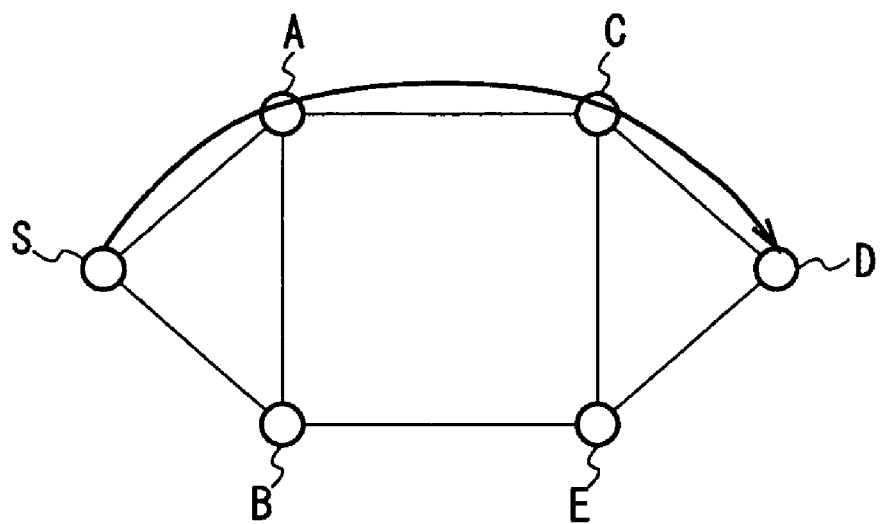
FIG. 16 is a diagram showing the configuration of an ad-hoc network system according to the embodiment.

In FIG. 16, reference numeral 60 denotes an ad-hoc network system according to the embodiment. The ad-hoc network system 60 has almost the same configuration as the ad-hoc network system 1 as mentioned above with reference to FIG. 25 except an alternative route is discovered and established before the route is disconnected.

In this case, the ad-hoc network system 60 uses the route discovery process as mentioned above with reference to FIG.

25 to establish a communication route (represented by a thick line in FIG. 16) that successively passes through nodes A and C. This communication route is selected from multiple communication routes available between node S as transmission origin of data such as AV (Audio Video) data to be transmitted and node D as transmission destination. Node S successively transfers transmission data as a data packet to node D via the communication route.

In this state, nodes A through C and E on the communication route detect a disconnection symptom of the communication along routes between the other nodes S and A through E (e.g., routes between nodes B and C as upstream routes for node A) as a possible disconnection state.

Figure 17:
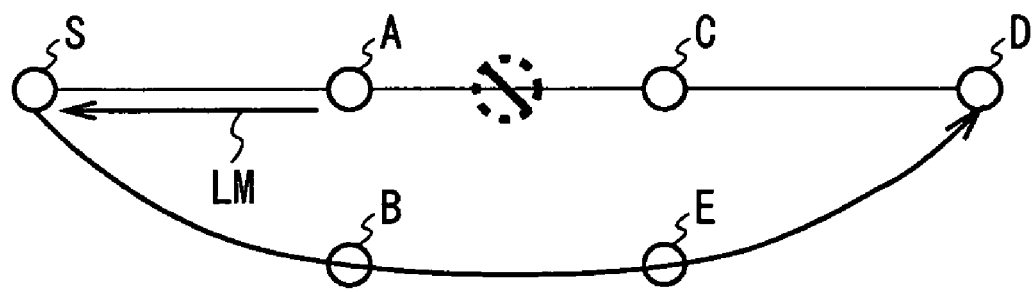
FIG. 17 is a diagram illustrating transmission of a link state notification message.

As shown in FIG. 17, for example, node A detects a possible disconnection state on the route to node B on the upstream side. Node A generates a control message (hereafter referred to as a link state notification message) LM for notifying the possible disconnection state and unicasts it to node S.

In this case, node S determines, based on the link state notification message LM unicast from node A, whether or not to change the current communication route to an alternative route.

When determining to use the alternative route, node S generates a control message (hereafter referred to as an extended route request message) for providing control to establish a route that is conditioned better than the possible disconnection state. The extended route request message is configured by extending the above-mentioned route request message 2 (FIG. 26), i.e., adding a field for representing the possible disconnection state to this message.

Node S broadcasts the extended route request message to start the route discovery process. In this case, nodes A through C and E, when receiving the extended route request message, determine whether or not the route to the node broadcasting the extended route request message maintains a communication state better than the possible disconnection state. This determination is performed before inserting route entries (entry insertion process) for a reverse path into the route table 4 (FIG. 27).

When the communication state is not better than the possible disconnection state as a determination result, nodes A through C and E discard the extended route request message. When the communication state is better than the possible disconnection state as a determination result, nodes A through C and E perform the entry insertion process as conventionally practiced to insert route entries into the route table 4 (FIG. 27). Each of nodes A through C and E broadcasts the extended route request message when not addressed to itself.

Accordingly, nodes A through C and E establish only the route conditioned better than the possible disconnection state as a reverse path.

When the extended route request message reaches node D, it generates the route reply message 6 (FIG. 28) as a response to the extended route request message. The route reply message 6 is the same as the conventional one described with reference to FIG. 25 (C). According to the process similar to that described with reference to FIG. 25 (C), the route reply message 6 is successively unicast to node S via nodes E and B, for example.

When receiving this route reply message, node S changes the direction of transferring the data packet from transfer to node A so far to transfer to node B. As a result, the data packet transfer route changes from the communication route (S-A-C-D) to the alternative route (S-B-E-D) before the route in the possible disconnection state (A-C) is disconnected.

In this manner, the ad-hoc network system 60 enables a change to the alternative route before disconnection of the route between nodes A and C on the communication route.

Figure 18:
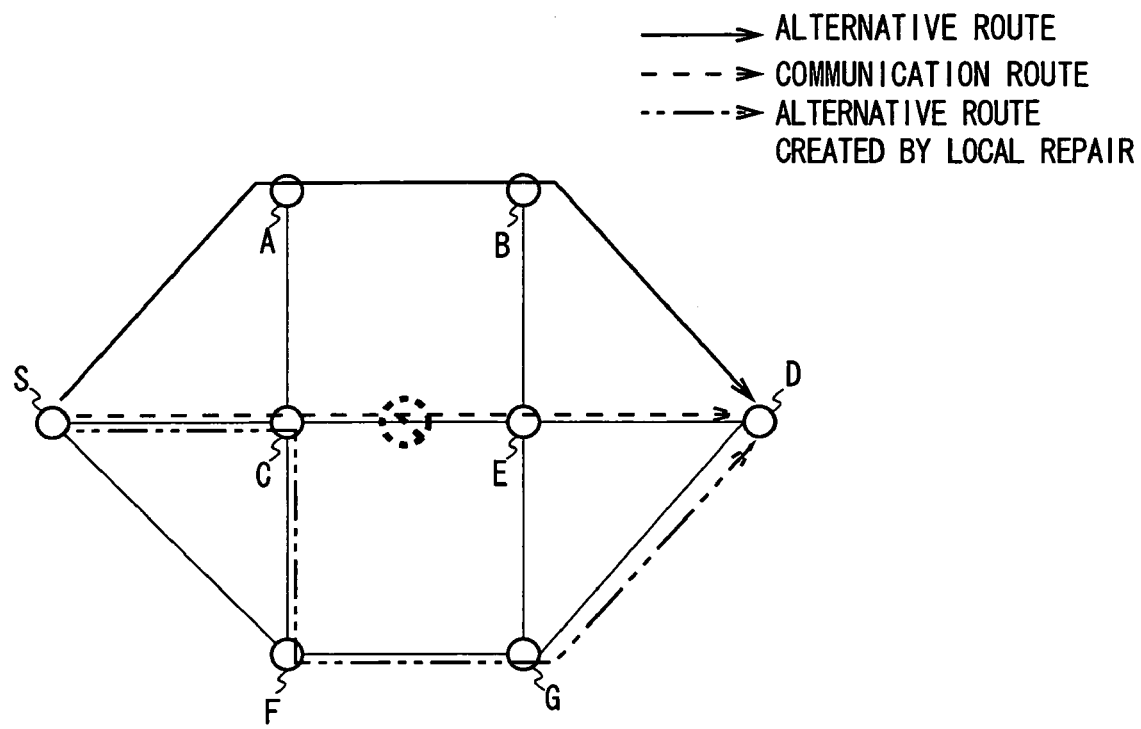
FIG. 18 is a diagram showing a communication route and an alternative route.

For example, FIG. 18 shows a case where a possible disconnection state occurs on a route (C-E), i.e., part of multiple communication routes successively passing through nodes C and E between nodes S and D. To re-execute the route discovery process from node S, the system can establish an alternative route (S-A-B-D) having the smallest hop count. This eliminates the need to select a detouring alternative route (S-C-F-G-D) having a large hop count using the disconnecting node (node A) as a start point, as conventionally practiced by the local repair.

The hardware configuration of the communication function block 11 installed in nodes A through E and S is described for the first embodiment (FIG. 2) and the description is omitted for simplicity.

(2-2) Specific Processes of Each Node

The following describes specific processes of each node.

(2-2-1) State Notification Process of Node A

First, the following describes node A's state notification process that notifies node S of a possible disconnection state on the route (A-C in FIG. 17) between nodes A and C.

The CPU 12 (FIG. 2) of node A detects a possible disconnection state on the route to node C. Possible disconnection states to be detected include a state that causes the electric wave intensity of an antenna ANT (FIG. 2) connected to the communication processing section 15 (FIG. 4) to be smaller than or equal to a first threshold value (hereafter referred to as an intensity threshold value).

The intensity threshold value is predetermined in consideration for the relationship between a limit on communicable data packets and the time needed to change the communication route to an alternative route. Specifically, the intensity threshold value is set to 23 [V/m] when an optimum electric wave intensity value is assumed to be 100 [V/m], for example.

Specifically, the CPU 12 periodically measures the electric wave intensity of the antenna ANT. Each time a data packet is transferred to node C, the CPU 12 compares a measurement result (electric wave intensity value) from the antenna ANT at the time of reception with the intensity threshold value. When the electric wave intensity value is smaller than or equal to the intensity threshold value, the CPU 12 detects the electric wave intensity value as a possible disconnection state.

In addition, the number of requests to retransfer a data packet against the number of data packet transfers (hereafter referred to as a packet error ratio) may become greater than or equal to a second threshold value (hereafter referred to as an error threshold value). The CPU 12 also detects this state as a possible disconnection state.

Similarly to the intensity threshold value, the error threshold value is also predetermined in consideration for the relationship between a limit on communicable data packets and the time needed to change the communication route to an alternative route. For example, the error threshold value is set to 15[ ].

Specifically, the CPU 12 counts the number of data packets transferred to node B and the number of data packet retransfers requested by node B. Based on the count values, the CPU 12 measures packet error ratios.

Each time a data packet is transferred to node C, the CPU 12 compares the packet error ratio at the time of reception with the error threshold value. When the packet error ratio is greater than or equal to the error threshold value, the CPU 12 detects the packet error ratio as a possible disconnection state.

As a possible disconnection state, the CPU 12 may detect either or both an electric wave intensity value smaller than or equal to the intensity threshold value and a packet error ratio greater than or equal to the error threshold value. In this case, the CPU 12 generates the link state notification message LM as shown in FIG. 19 based on the detection result.

The link state notification message LM is composed of "Message ID", "Originator Address", "Source Address", "Destination Address", "Link Quality", "Packet Error Rate", "Route Status", and "Comment" fields $70_1$ through $70_8$.

"Message ID" field $70_1$ stores a unique message ID provided for the message LM. "Link Quality" field $70_5$ stores an electric wave intensity value smaller than or equal to the intensity threshold value. "Packet Error Rate" field $70_6$ stores a packet error ratio greater than or equal to the error threshold value. "Route Status" field $70_7$ stores a state indicating whether or not the route is used as a communication route. "Comment" field $70_8$ stores given additional information.

There may be a case of detecting only one of an electric wave intensity value smaller than or equal to the intensity threshold value and a packet error ratio greater than or equal to the error threshold value. In such case, "0" is stored in "Link Quality" field or "Route Status" field $70_7$ of the other not detected.

The CPU 12 unicasts the link state notification message LM to node S. As a result, the link state notification message LM notifies node S which node is in what grade of possible disconnection, and the like.

According to the embodiment, the CPU 12 functions based on the timer 16 to limit the number of times to transmit the link state notification message LM within a unit time (hereafter referred to as a message notification period).

In this manner, a state notification section 21 notifies a communication state of the route between nodes S and A to avoid a situation where an increased value in the link state notification message LM prevents data packets from being transferred.

By executing the state notification process, the CPU 12 can notify node S of a possible disconnection state (an electric wave intensity value smaller than or equal to the intensity threshold value or a packet error ratio greater than or equal to the error threshold value).

Figure 20:
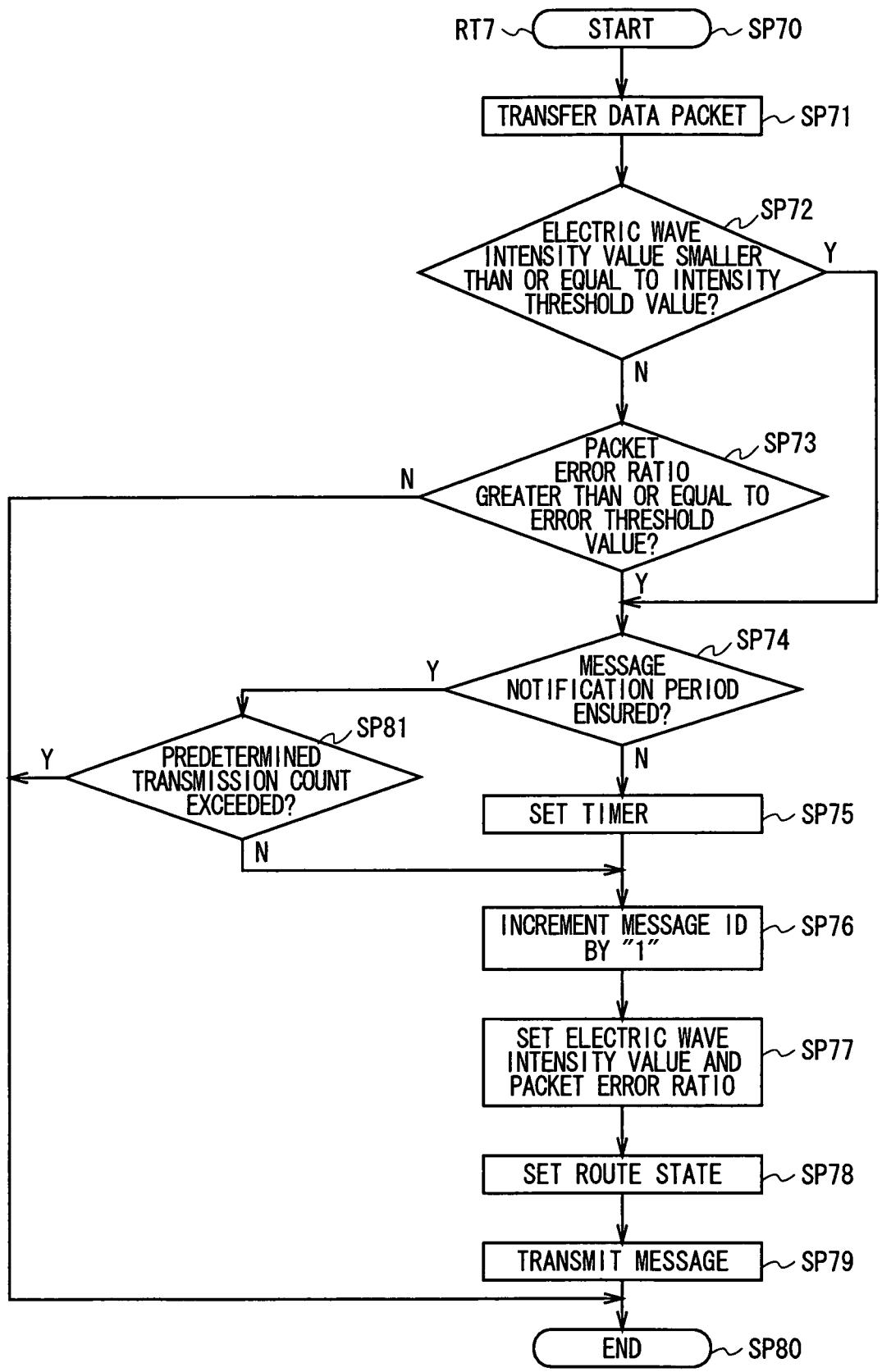
FIG. 20 is a flowchart showing a state notification process procedure.

The CPU 12 performs the above-mentioned state notification process in accordance with a state notification process procedure RT7 as shown in FIG. 20.

The CPU 12 receives a data packet transferred from node S and starts the state notification process procedure RT7 at Step SP70. At Step SP71, the CPU 12 transfers the data packet to upstream node B on the communication route.

At Step SP72, the CPU 12 determines whether or not an electric wave intensity value of the antenna ANT is smaller than or equal to the intensity threshold value. At Step SP73, the CPU 12 determines whether or not a packet error ratio is greater than or equal to the error threshold value.

A negative result may be obtained from Steps SP72 and SP73. This indicates a good communication state, not a possible disconnection state. At this time, the CPU 12 proceeds to Step SP80 to terminate the state notification process procedure RT7.

An affirmative result may be obtained at least one of Steps SP72 and SP73. This indicates a possible disconnection state. At this time, the CPU 12 determines at Step SP74 whether or not a message notification period takes effect. When obtaining a negative result, the CPU 12 sets the timer for the message notification period at Step SP75.

At Step SP76, the CPU 12 increments the message ID (Message ID (FIG. 19)) by "1". At Step SP77, the CPU 12 stores an electric wave intensity value smaller than or equal to the intensity threshold value in "Link Quality" field $70_5$ (FIG. 19) or a packet error ratio greater than or equal to the error threshold value in "Route Status" field $70_7$ (FIG. 19). At Step SP78, the CPU 12 stores corresponding contents in the remaining fields $70_2$ through $70_4$, $70_6$, and $70_8$ (FIG. 19) based on the route table 4 (FIG. 27) to generate the link state notification message LM (FIG. 19). At Step SP79, the CPU 12 unicasts the link state notification message LM to node S. The CPU 12 proceeds to Step SP80 to terminate the state notification process procedure RT7.

When obtaining an affirmative result at Step SP74, the CPU 12 proceeds to Step SP81 to determine whether or not the predetermined number of transmissions is exceeded. Only when obtaining a negative result, the CPU 12 performs the processes at Steps SP76 through SP79 to unicast the link state notification message LM to node S. The CPU 12 then proceeds to Step SP to terminate the state notification process procedure RT7.

In this manner, the CPU 12 can perform the state notification process according to the state notification process procedure RT7.

While there has been described the state notification process and the procedure RT7 in node A, the CPU 12 also performs the state notification process in accordance with the state notification process procedure RT1 for the other nodes B, C, and E like node A. According to the embodiment, however, upstream routes are not in the possible disconnection state. Nodes B, C, and E perform a loop of Steps SP70, SP71, SP72, SP73, and SP80.

(2-2-2) Route Reestablishment Request Process of Node S

The following describes a route reestablishment request process of node S. Based on the link state notification message LM, node S provides control to establish a communication route in a link state better than a possible disconnection state (causing an electric wave intensity value smaller than or equal to the intensity threshold value or a packet error ratio greater than or equal to the error threshold value).

When receiving the link state notification message LM unicast from node A, the CPU 12 of node S functions based on a link state table 71 as shown in FIG. 21 to determine the presence or absence of a route reestablishment request and route request conditions.

The link state table 71 relates to each node transmitting the link state notification message LM and represents a possible disconnection state and the like of a route upstream to that node. The link state table 71 is composed of "Destination Address", "Originator Address", "Message ID", "Count", "Link Quality", "Packet Error Rate", "Route Status", and miscellaneous fields $72_1$ through $72_8$.

"Count" field 724 stores the number of receptions of the link state notification message LM. When a unit time elapses from the time when initial value "1" is set, value "1" is resumed as an initial value. Accordingly, "Count" field $72_4$ stores the number of receptions of the link state notification message LM per unit time (hereafter referred to as a unit-time-based reception count). The unit-time-based reception count is set to an appropriate value in consideration for the limitation on the number of transmissions of the link state notification message LM from node A (nodes B through D) during the message notification period.

Effectively, the CPU 12 functions based on "Destination Address" field $70_4$ (FIG. 19) contained in the link state notification message LM received from node A to determine whether or not the link state notification message LM is addressed to itself. When the link state notification message LM is not addressed to itself, the CPU 12 determines whether or not the link state table 71 contains the address of the transmission origin (node A) of the message. This address is stored in "Originator Address" field $70_2$ (FIG. 19).

When no address is available for node A, the CPU 12 adds the following information in the received link state notification message LM (FIG. 19) as new records to the corresponding fields $72_1$ through $72_8$ in the link state table 71: the transmission origin address (Originator Address), the unique ID (Message ID) given to the message LM, the electric wave intensity value (Link Quality), the packet error ratio (Packet Error Rate), the presence or absence of available routes (Route Status), and the like.

At this time, the CPU 12 places initial value "1" in the "Count" field added as a new record. The CPU 12 sets the timer 16 from the time the initial value is set. The CPU 12 measures the unit-time-based reception count of the link state notification message LM transmitted from node A.

The address of node A may already exist (i.e., as a record). In this case, the CPU 12 finds an average value between each of the values stored in "Link Quality" and "Packet Error Rate" fields $72_5$ and $72_6$ of the link state table 71 corresponding to the node A's address and each of values stored in "Link Quality" and "Packet Error Rate" fields $70_5$ and $70_6$ (FIG. 19) of the link state notification message LM. The CPU 12 updates the values stored in "Link Quality" and "Packet Error Rate" fields $72_5$ and $72_6$ to the average values as statistical values. In addition, the CPU 12 increments the corresponding "Count" field $72_4$ by "1".

There may be a case where the unit-time-based reception count for the incremented "Count" field $72_4$ exceeds a specified value and "Route Status" field $72_7$ corresponding to the "Count" field $72_4$ represents the used communication route. In this case, the CPU 12 determines that it is necessary to request the route reestablishment.

At this time, "Link Quality" and "Packet Error Rate" fields $72_5$ and $72_6$ of the link state table 71 store values (the electric wave intensity value and the packet error ratio, respectively). The CPU 12 determines these values as a route request condition.

Figure 22:
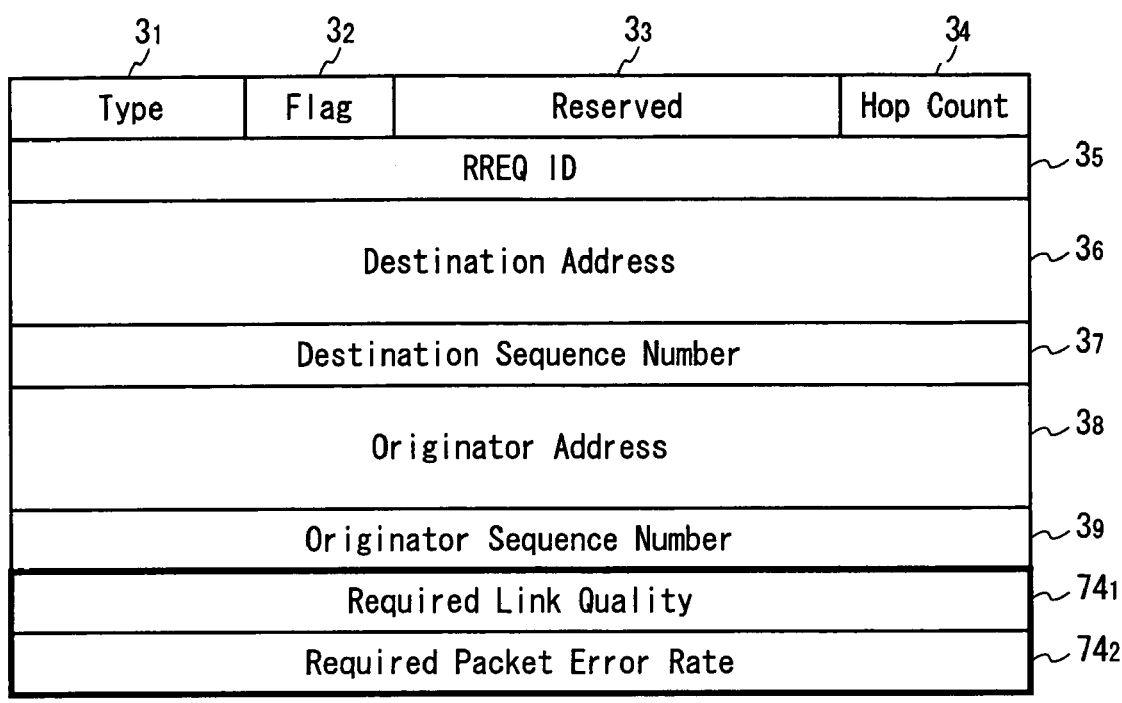
FIG. 22 is a diagram showing the configuration of an extended route request message.

Afterwards, the CPU 12 generates a extended route request message 73 as shown in FIG. 22 based on the route request condition and the route table 4 (FIG. 27).

The extended route request message 73 is composed of fields $3_1$ through $3_9$ of the route request message 2 (FIG. 26) supplemented by fields $74_1$ and $74_2$ for the electric wave intensity value (Required Link Quality) and the packet error ratio (Required Packet Error Rate), respectively. "Required Link Quality" and "Required Packet Error Rate" fields $74_1$ and $74_2$ store the corresponding route request condition (electric wave intensity value and packet error ratio).

The CPU 12 broadcasts the extended route request message 73. As a result, each node uses the extended route request message 73 to establish a reverse path as an alternative route. The reverse path is conditioned so that its electric wave intensity value is greater than the corresponding value in the extended route request message 73 and its packet error ratio is smaller than the corresponding value therein.

In this manner, the CPU 12 measures the number of occurrences of the link state notification message LM at each unit time. The CPU 12 broadcasts the extended route request message 73 only when the measurement result exceeds a specified value. This makes it possible to prevent an alternative route from being used even when it is expected to immediately recover from a possible disconnection state.

At this time, the CPU 12 broadcasts the extended route request message 73 that establishes a route better conditioned than a statistical result (average value) of possible disconnection states (electric wave states and packet error ratios) corresponding to the number of notification occurrences. This can prevent establishment of an alternative route that may exceed the possible disconnection state composed of extreme electric wave states and packet error ratios. It is possible to establish an alternative route in as good a condition as possible.

In this manner, the CPU 12 performs the route reestablishment request process to be able to provide control to establish the communication route in a link state better than the possible disconnection state (indicative of an electric wave intensity value smaller than or equal to the intensity threshold value or a packet error ratio greater than or equal to the error threshold value).

Figure 23:
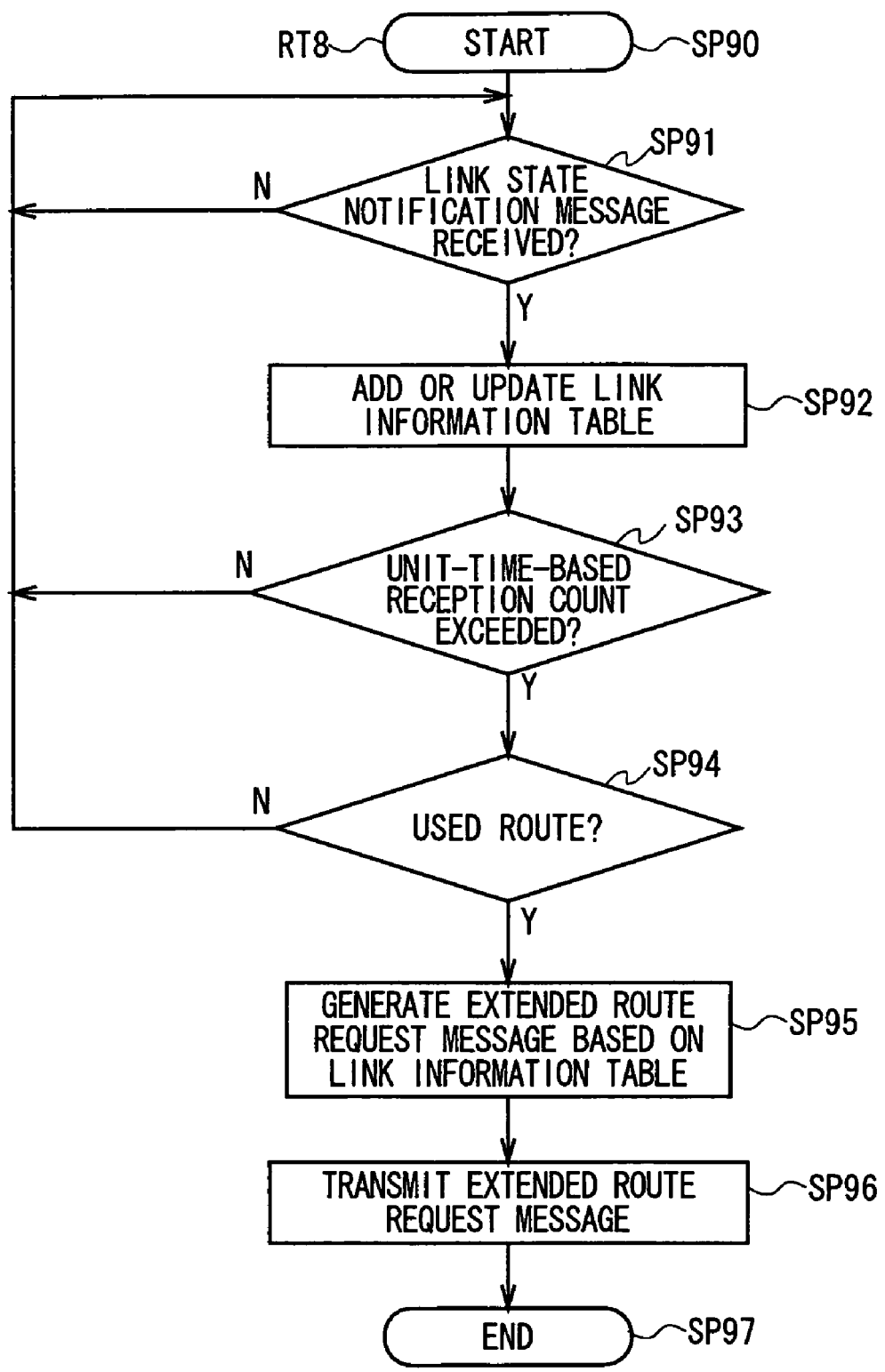
FIG. 23 is a flowchart showing a route reestablishment request process procedure.

The CPU 12 performs the route reestablishment request process in accordance with a route reestablishment request process procedure RT8 as shown in FIG. 23.

For example, the CPU 12 recognizes that a communication route is established via the route discovery process. The CPU 12 then stars the route reestablishment request process procedure RT8 from Step SP90. At Step SP91, the CPU 12 determines whether or not to receive the link state notification message LM unicast from the node (node A).

When receiving the link state notification message LM, the CPU 12 proceeds to Step SP92 to add a new record to the link state table 71 (FIG. 21) based on the link state notification message LM received at Step SP91. Alternatively, the CPU 12 updates the electric wave intensity value (Link Quality), the packet error ratio (Packet Error Rate), and the unit-time-based reception count (Count) of the already added record.

At Step SP93, the CPU 12 determines whether or not the unit-time-based reception count (Count) updated (or added) at Step SP92 is greater than or equal to a specified value. At Step SP94, the CPU 12 determines whether or not the active route (Route Status) corresponds to a route passing through the node (node A) issuing the link state notification message LM received at Step SP91.

A negative result may be obtained only at one of Steps SP93 and SP94. This signifies: the node route on the communication route may be restored to a good state; or the communication route does not contain a node route expected to be disconnected and therefore the communication route need not be changed to an alternative route. At this time, the CPU 12 returns to Step SP91 to repeat the above-mentioned process.

On the other hand, an affirmative result may be obtained at both Steps SP93 and SP94. This signifies that the node route on the communication route does not seem to be restored to a good state and the communication route needs to be promptly changed to an alternative route. At this time, the CPU 12 proceeds to Step SP95.

At Step SP95, the CPU 12 generates the extended route request message 73 (FIG. 22) based on the link state table 71 (FIG. 21). At Step SP95, the CPU 12 broadcast the extended route request message 73. The CPU 12 proceeds to Step SP97 to terminate the route reestablishment request process procedure RT8.

In this manner, the CPU 12 can perform the route reestablishment request process in accordance with the route reestablishment request process procedure RT8.

(2-3) Node Reestablishment Process of Nodes A Through C and E

The following describes the node reestablishment process of nodes A through C and E. This process is performed based on the extended route request message 73 to establish a link condition better than the possible disconnection state (indicative of an electric wave intensity value smaller than or equal to the intensity threshold value or a packet error ratio greater than or equal to the error threshold value).

The CPU 12 for nodes A through C and E measures an electric wave intensity value and a packet error ratio as mentioned above with reference to the state notification process. When receiving the extended route request message 73, the CPU 12 compares measurement results of the electric wave intensity value and the packet error ratio at the time of receiving this message with the route request condition contained in the extended route request message 73 (FIG. 22), i.e., the electric wave intensity value and the packet error ratio stored in that message ("Required Link Quality" and "Required Packet Error Rate" fields $74_1$ and $74_2$).

When at least one of the measurement results for the electric wave intensity value and the packet error ratio does not satisfy the route request condition, the upstream route for the node that broadcast the extended route request message 73 is placed in a worse state than the route (A-C (FIG. 17)) in a possible disconnection state. In this case, the CPU 12 discards the extended route request message 73.

On the other hand, when the measurement results for both the electric wave intensity value and the packet error ratio satisfy the route request condition, the upstream route for the node that broadcast the extended route request message 73 is placed in a better state than the route (A-C (FIG. 17)) in a possible disconnection state.

In this case, the CPU 12 performs an entry insertion process as conventionally practiced to insert a rout entry into the route table 2 (FIG. 26). When the extended route request message 73 is not addressed to itself, the CPU 12 reexecutes the broadcasting.

In this manner, the CPU 12 performs the route reestablishment process to enable a link state better than the possible disconnection state (indicative of an electric wave intensity value smaller than or equal to the intensity threshold value or a packet error ratio greater than or equal to the error threshold value).

Figure 24:
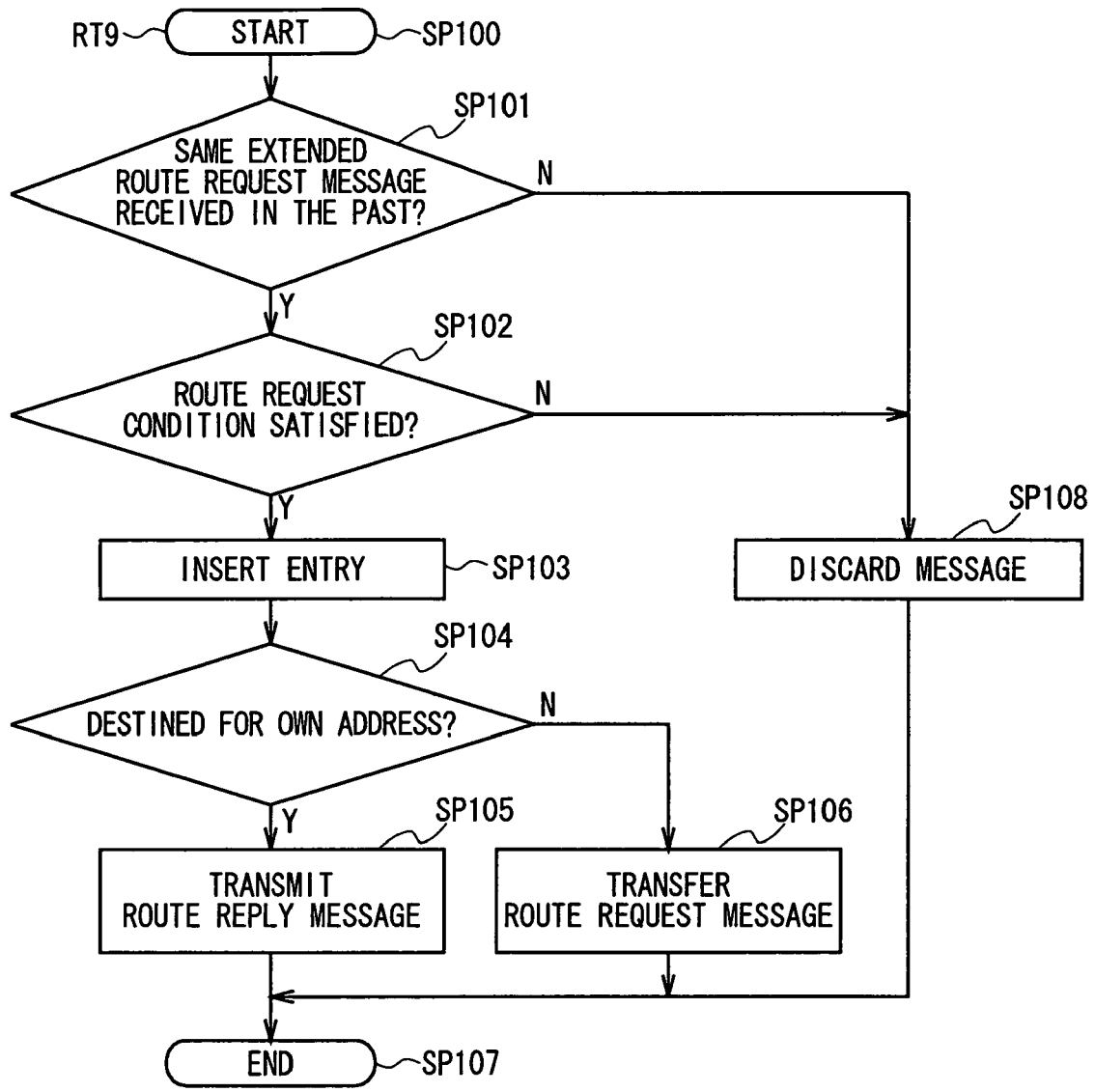
FIG. 24 is a flowchart showing a route reestablishment process procedure.

The CPU 12 performs the above-mentioned route reretrieval process in accordance with a route reretrieval process procedure RT10 in FIG. 24.

When receiving the extended route request message 73, the CPU 12 starts the route reretrieval process procedure RT10 at Step SP100. At Step SP101, the CPU 12 prevents the message from being received doubly by determining whether or not the extended route request message 73 (RREQ ID (FIG. 22)) has been received. The CPU 12 proceeds to Step SP102 to determine whether or not there is a communication route satisfying the route request condition.

An affirmative result may be obtained at both Steps SP101 and SP102. This signifies that the upstream route for the node broadcasting the extended route request message 73 is in a better state than the route (A-C (FIG. 17) in the possible disconnection state. At this time, the CPU 12 proceeds to Step SP103.

At Step SP103, the CPU 12 performs the entry insertion process to insert the route entry based on the extended route request message 73 into the route table 2 (FIG. 26). At Step SP104, the CPU 12 determines whether or not "Destination Address" field $3_6$ of the extended route request message 73 indicates its own address.

When obtaining an affirmative result, the CPU 12 proceeds to Step SP105 to unicast the route reply message 6 (FIG. 28) to the node corresponding to the route entry inserted into the route table 2. When obtaining a negative result, the CPU 12 proceeds to Step SP106 to broadcast the extended route request message 73. The CPU 12 then proceeds to Step SP107 to terminate the route reretrieval process procedure RT10.

On the other hand, a negative result may be obtained at least at one of Steps SP101 and SP102. This signifies that the upstream route for the node broadcasting the extended route request message 73 is placed in a worse sate than the route (A-C (FIG. 17)) in the possible disconnection state. At this time, the CPU 12 proceeds to Step SP108 to discard the extended route request message 73. The CPU 12 then proceeds to Step SP107 to terminate the route reretrieval process procedure RT10.

In this manner, the CPU 12 can perform the route reretrieval process in accordance with the route reretrieval process procedure RT10.

(2-4) Operations and Effects of the Second Embodiment

According to the above-mentioned configuration, the ad-hoc network system 60 detects a possible disconnection state on the routes (A-B, A-C, . . . , C-D (FIG. 16)) from node S as transmission origin to node D as transmission destination. The ad-hoc network system 60 originates a message based on the creation condition according to routes other than the route (A-C (FIG. 17)) matching the possible disconnection state.

Accordingly, the ad-hoc network system 60 can ensure an alternative route (S-B-E-D (FIG. 17) before the route (A-C (FIG. 17) in the possible disconnection state is disconnected. The system can always ensure the transfer state of data packets between nods S and D. It is possible to efficiently provide the error handling even for communication modes such as the realtime communication requiring instancy.

In this case, the ad-hoc network system 60 detects the possible disconnection state based on two different communication criteria, i.e., the electric wave intensity and the packet error ratio.

Accordingly, the ad-hoc network system 60 can detect the cause of the possible disconnection state from two aspects. Even though the electric wave state is good, the route may be disconnected due to transfer of a data packet that exceeds its transfer throughput. Even in such case, a possible disconnection state can be reliably detected. Accordingly, it is possible to more efficiently provide the error handling.

Further in this case, the ad-hoc network system 60 generates and originates the link state notification message LM (FIG. 19) based on the creation condition according to a route that is in a better state than the detected possible disconnection state.

The ad-hoc network system 60 can ensure an alternative route that is hardly disconnected. It is possible to eliminate process loads and the time to repeatedly create alternative routes, making it possible to more efficiently provide the error handling.

According to the above-mentioned configuration, the system detects a possible disconnection state on the route between node S as transmission origin and node D as transmission destination. The system originates a message based on the creation condition according to routes other than the route that matches the possible disconnection state. Consequently, it is possible to efficiently provide the error handling even for communication modes such as the realtime communication requiring instancy. The reliable communication system can be provided.

(2-5) Other Embodiments

While the above-mentioned embodiment has described the case where the present invention is applied to the AODV protocol ad-hoc network 10 and nodes A through E and S constituting the network, the present invention is not limited thereto. The ad-hoc network 10 may be composed of multiple communication terminals. A first message may be transmitted from a first communication terminal to a third communication terminal via a second communication terminal. In response to the first message, a second message may be transmitted from the third communication terminal to the first communication terminal via the second communication terminal. Based on these messages, the first through third communication terminals may create routes to the first or third communication terminal. The created routes may be used for communication between the first and third communication terminals. The present invention can be widely applied to such communication system and a communication terminal device constituting the communication system.

According to the above-mentioned embodiment, a disconnection symptom of communication on the upstream route for data is detected as a possible disconnection state. There is provided a state notification means (CPU 12) for notifying the transmission origin of the possible disconnection state. The state notification means detects either or both an electric wave intensity value smaller than or equal to the intensity threshold value and a packet error ratio greater than or equal to the error threshold value. Based on this detection result, the link state notification message LM in FIG. 5 is notified. While the embodiment has been described as such, the present invention is not limited thereto. The other various detection techniques may be used for the detection. The other various formats may be used for the notification. In this case, it may be preferable to use part of the routing protocol and use the routing protocol in combination with messages for higher-order layers.

In this case, the possible disconnection state is detected based on two types of communication criteria, i.e., the electric wave intensity and the packet error ratio. Instead, it may be preferable to use communication criteria such as the frequency of use of routes, the presence or absence of available routes, and the like. Alternatively, these criteria may be added to the electric wave intensity and the packet error ratio. Further, a combination of various communication criteria may be appropriately changed according to communication states. In this manner, it is possible to more accurately detect a possible disconnection state.

According to the above-mentioned embodiment, a message is generated based on the creation condition according to routes other than the route matching the possible disconnection state notified from the second communication terminal. There is provided a message origination means (CPU 10) for originating the message. The message origination means generates a message based on the creation condition according to a route in a better condition than the possible disconnection state. While the embodiment has been described as such, the present invention is not limited thereto. The essential thing is to generate and originate a message based on the creation condition according to routes other than the route matching the possible disconnection state notified from the second communication terminal. In this case, various creation conditions can be determined in accordance with the above-mentioned communication criteria.

When generating a message based on the creation condition according to a route in a better state than the possible disconnection, the CPU 12 measures the number of notification occurrences of the possible disconnection state on a unit time basis. When the measurement result exceeds a specified value, the CPU 12 generates the extended route request message 73 as shown in FIG. 22. The other various measurement techniques may be used for the measurement. The extended route request message 73 may be otherwise formatted. Further, the extended route request message 73 may be used as part of the routing protocol or in combination with messages for higher-order layers.

While the above-mentioned embodiment has described the case where the number of transmissions of the link state notification message LM is limited during a predetermined message notification period, the present invention is not limited thereto. It may be preferable to provide such limitation as to once transmit the link state notification message LM based on the number of transfers of data packets as one unit, for example. The essential thing is to limit the number of notifications of a possible disconnection state to the first communication terminal at a specified ratio.

INDUSTRIAL APPLICABILITY

The present invention can be applied to not only the ad-hoc network system, but also various network systems.

The invention claimed is:

1. A communication system comprising:
a plurality of communication terminals, and based on a message originated from a first communication terminal to a third communication terminal via a second communication terminal, each communication terminal included in the plurality of communication terminals creates routes to the first communication terminal by using the second and third communication terminals to communicate between the first and third communication terminals via the created route,
wherein the second communication terminal has state notification means for detecting a possible disconnection state in terms of a disconnection symptom for communication on the route as an upstream side for the message and notifying the possible disconnection state to the first communication terminal, wherein a number of notifications of the possible disconnection state transmitted to the first communication terminal is limited to a specified ratio of one notification to a predetermined number of data packets transmitted between the first and third communication terminals, and
the first communication terminal has message origination means for generating the message using a creation condition according to a route other than the route matching the possible disconnection state notified from the second communication terminal and originating the message.

2. The communication system according to claim 1, wherein the state notification means detects the possible disconnection state based on at least two different communication criteria.

3. The communication system according to claim 1, wherein the state notification means limits the number of the possible disconnection states notified to the first communication terminal at a specified ratio.

4. The communication system according to claim 1, wherein the message origination means generates the message using a creating condition according to the route in a better condition than the possible disconnection state.

5. The communication system according to claim 1, wherein the message origination means measures the number of notifications of the possible disconnection state notified from the second communication terminal on a unit time basis and, when a measurement result exceeds a specified number of times, generates the message using a creation condition according to a route other than the route.

6. The communication system according to claim 5, wherein the message origination means measures the number of notifications of the possible disconnection state notified from the second communication terminal on a unit time basis and, when a measurement result exceeds a specified number of times, generates the message using a creation condition according to a route in a better state than statistical results of the possible disconnection states corresponding to the number of notifications.

7. A communication terminal device comprising:
a memory to store routes, created by the terminal device, to a first communication terminal,
the terminal device mediates between the first communication terminal as a transmission origin and a second communication terminal as a transmission destination and based on a message originated from the first communication terminal to the second communication terminal, creates the routes to the first communication terminal ; and
state notification means for detecting a possible disconnection state in terms of a disconnection symptom for communication on the routes as an upstream side for the message and notifying the possible disconnection state to the first communication terminal, wherein a number of notifications of the possible disconnection state transmitted to the first communication terminal is limited to a specified ratio of one notification to a predetermined number of data packets transmitted between the first and second communication terminals.

8. The communication terminal device according to claim 7,
wherein the state notification means detects the possible disconnection state based on at least two different communication criteria.

9. The communication terminal device according to claim 7,
wherein the state notification means limits the number of the possible disconnection states notified to the first communication terminal at a specified ratio.

10. A communication method for a communication terminal device, the method comprising:
mediating between a first communication terminal as a transmission origin and a second communication terminal as a transmission destination;
a first step of creating, by the communication terminal device, routes to the first communication terminal based on a message originated from the first communication terminal to the second communication terminal;
a second step of detecting a possible disconnection state in terms of a disconnection symptom for communication on the routes as an upstream side for the message; and
a third step of notifying the possible disconnection state detected by the first step to the first communication terminal, wherein a number of notifications of the possible disconnection state transmitted to the first communication terminal is limited to a specified ratio of one notification to a predetermined number of data packets transmitted between the first and second communication terminals.

11. A communication terminal device comprising:
a memory to store routes to the terminal device,
wherein, based on a message originated from the terminal device to a first communication terminal as a transmission destination, the terminal device creates routes to the terminal device by means of a second communication terminal mediating between the terminal device and a first communication terminal and communicates with the first communication terminal via one of the created routes; and
message origination means for, when the second communication terminal notifies a possible disconnection state in terms of a disconnection symptom for communication on a first route upstream of the message, generating the message using a creation condition according to a second route other than a first route matching the possible disconnection state and originating the message,
wherein a number of notifications of the possible disconnection state received by the communication terminal device is limited to a specified ratio of one notification to a predetermined number of data packets transmitted between the communication terminal device and the first communication terminal.

12. The communication terminal device according to claim 11,
wherein the message origination means generates the message using a creating condition according to the second route in a better condition than the possible disconnection state.

13. The communication terminal device according to claim 11,
wherein the message origination means measures the number of notifications of the possible disconnection state notified from the mediating communication terminal on a unit time basis and, when a measurement result exceeds a specified number of times, generates the message using a creation condition according to a third route other than the first route.

14. The communication terminal device according to claim 13,
wherein the message origination means measures the number of notifications of the possible disconnection state notified from the mediating communication terminal on a unit time basis and, when a measurement result exceeds a specified number of times, generates the message using a creation condition according to a fourth route in a better state than statistical results of the possible disconnection states corresponding to the number of notifications.

15. A communication method for a communication terminal device, the method comprising:
a first step of creating routes, based on a message originated from itself to a first communication terminal as a transmission destination, to the terminal device by means of a second communication terminal mediating between the terminal device and the first communication terminal, the terminal device communicating with the first communication terminal via one of the created routes
a second step of, when the mediating communication terminal notifies a possible disconnection state in terms of a disconnection symptom for communication on a first route upstream of the message, generating the message using a creation condition according to a second route other than the first route matching the possible disconnection state; and
a third step of originating the message generated by the first step, wherein a number of notifications of the possible disconnection state received by the communication terminal device is limited to a specified ratio of one notification to a predetermined number of data packets transmitted between the communication terminal device and the first communication terminal.

16. A non-transitory computer readable storage medium on which is recorded a program which, when executed in a communication terminal device, causes the communication terminal device to:
mediate between a first communication terminal as a transmission origin and a second communication terminal as a transmission destination;

create routes to the communication terminal as transmission origin based on a message originated from the first communication terminal to the second communication terminal;

detect a possible disconnection state in terms of a disconnection symptom for communication on a first route as an upstream side for the message; and notifying the possible disconnection state detected by the first step to the first communication terminal, wherein a number of notifications of the possible disconnection state transmitted to the first communication terminal is limited to a specified ratio of one notification to a predetermined number of data packets transmitted between the first and second communication terminals.

17. A non-transitory computer readable storage medium on which is recorded a program which, when executed in a communication terminal device, causes the communication terminal device to:

create routes, based on a message originated from the terminal device to a first communication terminal as a transmission destination, to the terminal device by means of a second communication terminal mediating between the terminal device and the first communication terminal the terminal device communicating with the first communication terminal via one of the created routes;

when the mediating communication terminal notifies a possible disconnection state in terms of a disconnection symptom for communication on a first route upstream of the message, generate the message using a creation condition according to a second route other than the first route matching the possible disconnection state; and originate the message generated by the first step, wherein a number of notifications of the possible disconnection state transmitted to the first communication terminal is limited to a specified ratio of at least one notification to a predetermined number of data packets transmitted between the communication terminal device and the first communication terminal.

\* \* \* \* \*